(12) United States Patent
Dukhon et al.

(10) Patent No.: US 8,762,880 B2
(45) Date of Patent: Jun. 24, 2014

(54) EXPOSING NON-AUTHORING FEATURES THROUGH DOCUMENT STATUS INFORMATION IN AN OUT-SPACE USER INTERFACE

(75) Inventors: Marina Dukhon, Redmond, WA (US); Paula Guntaur, Seattle, WA (US); Jesse Clay Satterfield, Redmond, WA (US); Amy E. Alberts, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 347 days.

(21) Appl. No.: 12/163,784

(22) Filed: Jun. 27, 2008

(65) Prior Publication Data

US 2009/0083656 A1 Mar. 26, 2009

Related U.S. Application Data

(63) Continuation-in-part of application No. 11/823,999, filed on Jun. 29, 2007, now Pat. No. 8,201,103.

(51) Int. Cl.
*G06F 3/048* (2013.01)

(52) U.S. Cl.
USPC ............................................. 715/781

(58) Field of Classification Search
USPC .................. 715/764, 779–783, 200–250
See application file for complete search history.

(56) References Cited

U.S. PATENT DOCUMENTS

| | | | |
|---|---|---|---|
| 4,823,283 A | 4/1989 | Diehm et al. | |
| 5,155,806 A | 10/1992 | Hoeber et al. | |
| 5,220,675 A | 6/1993 | Padawer et al. | |

(Continued)

FOREIGN PATENT DOCUMENTS

| | | |
|---|---|---|
| AU | 2005203411 | 3/2006 |
| AU | 2007255043 | 8/2012 |

(Continued)

OTHER PUBLICATIONS

U.S. Appl. No. 12/725,605, filed Mar. 17, 2010 entitled "Improved User Interface for Displaying Selectable Software Functionality Controls that are Relevant to a Selected Object".

(Continued)

*Primary Examiner* — Omar Abdul-Ali
*Assistant Examiner* — Anil Bhargava
(74) *Attorney, Agent, or Firm* — Brian Haslam; Mike Allen; Micky Minhas

(57) ABSTRACT

An out-space actuator is selected to access an out-space user interface for a document editor program. An out-space actuator is associated with an in-space user interface having a displayed document. When the out-space actuator is selected, an out-space user interface is displayed that includes an expanded feature selection surface. The out-space user interface may be used to display one or more status panes for providing status information about a document being edited in the in-space user interface. Application features for affecting changes to a given document's status may be exposed in the out-space interface in proximity to associated status information. An out-space communication user interface (UI) component may be temporarily displayed in the document in-space user interface to communicate document status information that is presently available in the out-space user interface. A message bar may be displayed in the in-space user interface for communicating information from the out-space user interface.

20 Claims, 15 Drawing Sheets

(56) References Cited

U.S. PATENT DOCUMENTS

| | | |
|---|---|---|
| 5,247,438 A | 9/1993 | Subas et al. |
| 5,305,435 A | 4/1994 | Bronson |
| 5,323,314 A | 6/1994 | Baber et al. |
| 5,377,354 A | 12/1994 | Scannell et al. |
| 5,412,772 A | 5/1995 | Monson |
| 5,461,708 A | 10/1995 | Kahn |
| 5,500,936 A | 3/1996 | Allen et al. |
| 5,519,606 A | 5/1996 | Frid-Nielsen et al. |
| 5,559,875 A | 9/1996 | Bieselin et al. |
| 5,559,944 A | 9/1996 | Ono |
| 5,570,109 A | 10/1996 | Jenson |
| 5,581,677 A | 12/1996 | Myers et al. |
| 5,588,107 A | 12/1996 | Bowden et al. |
| 5,592,602 A | 1/1997 | Edmunds |
| 5,596,694 A | 1/1997 | Capps |
| 5,625,783 A | 4/1997 | Ezekiel et al. |
| 5,634,100 A | 5/1997 | Capps |
| 5,634,128 A | 5/1997 | Messina |
| 5,638,504 A | 6/1997 | Scott et al. |
| 5,644,737 A | 7/1997 | Tuniman et al. |
| 5,659,693 A | 8/1997 | Hansen et al. |
| 5,664,127 A | 9/1997 | Anderson et al. |
| 5,664,208 A | 9/1997 | Pavley et al. |
| 5,673,403 A | 9/1997 | Brown et al. |
| 5,721,847 A | 2/1998 | Johnson |
| 5,734,915 A | 3/1998 | Roewer |
| 5,760,768 A | 6/1998 | Gram |
| 5,760,773 A | 6/1998 | Berman et al. |
| 5,761,646 A | 6/1998 | Frid-Nielsen et al. |
| 5,764,960 A | 6/1998 | Perks et al. |
| 5,778,402 A | 7/1998 | Gipson |
| 5,778,404 A | 7/1998 | Capps et al. |
| 5,787,295 A | 7/1998 | Nakao ............... 715/210 |
| 5,793,365 A | 8/1998 | Tang et al. ............ 715/758 |
| 5,805,167 A | 9/1998 | van Cruyningen |
| 5,812,132 A | 9/1998 | Goldstein |
| 5,821,936 A | 10/1998 | Shaffer et al. |
| 5,828,376 A | 10/1998 | Solimene et al. |
| 5,838,321 A | 11/1998 | Wolf |
| 5,842,009 A | 11/1998 | Borovoy et al. |
| 5,844,558 A | 12/1998 | Kumar et al. |
| 5,844,572 A | 12/1998 | Schott |
| 5,855,006 A | 12/1998 | Huemoeller et al. |
| 5,864,848 A | 1/1999 | Horvitz et al. |
| 5,872,973 A | 2/1999 | Mitchell et al. |
| 5,873,108 A | 2/1999 | Goyal et al. |
| 5,874,956 A | 2/1999 | LaHood |
| 5,885,006 A | 3/1999 | Sheedy |
| 5,893,073 A | 4/1999 | Kasso et al. |
| 5,893,125 A | 4/1999 | Shostak |
| 5,898,436 A | 4/1999 | Stewart et al. |
| 5,899,979 A | 5/1999 | Miller et al. |
| 5,905,863 A | 5/1999 | Knowles et al. |
| 5,924,089 A | 7/1999 | Mocek et al. |
| 5,926,806 A | 7/1999 | Marshall et al. |
| 5,936,625 A | 8/1999 | Kahl et al. |
| 5,937,160 A | 8/1999 | Davis et al. |
| 5,940,078 A | 8/1999 | Nagarajayya et al. |
| 5,940,847 A | 8/1999 | Fein et al. |
| 5,943,051 A | 8/1999 | Onda et al. |
| 5,960,406 A | 9/1999 | Rasansky et al. |
| 5,970,466 A | 10/1999 | Detjen et al. |
| 5,999,173 A | 12/1999 | Ubillos |
| 5,999,938 A | 12/1999 | Bliss et al. |
| 6,008,806 A | 12/1999 | Nakajima et al. |
| 6,012,075 A | 1/2000 | Fein et al. |
| 6,016,478 A | 1/2000 | Zhang et al. |
| 6,018,343 A | 1/2000 | Wang et al. |
| 6,034,683 A | 3/2000 | Mansour et al. |
| 6,038,395 A | 3/2000 | Chow et al. |
| 6,038,542 A | 3/2000 | Ruckdashel |
| 6,043,816 A * | 3/2000 | Williams et al. ........... 715/783 |
| 6,067,087 A | 5/2000 | Krauss et al. |
| 6,067,551 A * | 5/2000 | Brown et al. ............... 1/1 |
| 6,072,492 A | 6/2000 | Schagen et al. |
| 6,073,110 A | 6/2000 | Rhodes et al. |
| 6,073,142 A | 6/2000 | Geiger et al. |
| 6,085,206 A | 7/2000 | Domini et al. |
| 6,101,480 A | 8/2000 | Conmy et al. |
| 6,133,915 A | 10/2000 | Arcuri et al. |
| 6,154,755 A | 11/2000 | Dellert et al. |
| 6,175,363 B1 | 1/2001 | Williams et al. |
| 6,188,403 B1 | 2/2001 | Sacerdoti et al. |
| 6,192,381 B1 | 2/2001 | Stiegemeier et al. |
| 6,195,094 B1 | 2/2001 | Celebiler ............... 715/764 |
| 6,199,102 B1 | 3/2001 | Cobb |
| 6,211,879 B1 | 4/2001 | Soohoo |
| 6,216,122 B1 | 4/2001 | Elson |
| 6,219,670 B1 | 4/2001 | Mocek et al. |
| 6,222,540 B1 | 4/2001 | Sacerdoti |
| 6,232,971 B1 * | 5/2001 | Haynes ............... 715/800 |
| 6,236,396 B1 | 5/2001 | Jenson et al. |
| 6,237,135 B1 | 5/2001 | Timbol |
| 6,239,798 B1 | 5/2001 | Ludolph et al. |
| 6,256,628 B1 | 7/2001 | Dobson et al. |
| 6,269,341 B1 | 7/2001 | Redcay, Jr. |
| 6,278,450 B1 | 8/2001 | Arcuri et al. |
| 6,289,317 B1 | 9/2001 | Peterson |
| 6,307,544 B1 | 10/2001 | Harding |
| 6,307,574 B1 | 10/2001 | Ashe |
| 6,313,854 B1 | 11/2001 | Gibson |
| 6,323,883 B1 | 11/2001 | Minoura et al. |
| 6,326,962 B1 | 12/2001 | Szabo |
| 6,327,046 B1 | 12/2001 | Miyamoto et al. |
| 6,341,277 B1 | 1/2002 | Coden et al. |
| 6,353,451 B1 | 3/2002 | Teibel et al. |
| 6,359,634 B1 | 3/2002 | Cragun et al. |
| 6,373,507 B1 | 4/2002 | Camara et al. |
| 6,384,849 B1 | 5/2002 | Morcos et al. |
| 6,385,769 B1 | 5/2002 | Lewallen |
| 6,405,216 B1 | 6/2002 | Minnaert et al. |
| 6,424,829 B1 | 7/2002 | Kraft |
| 6,429,882 B1 | 8/2002 | Abdelnur et al. |
| 6,430,563 B1 * | 8/2002 | Fritz et al. ............... 707/694 |
| 6,433,801 B1 | 8/2002 | Moon et al. |
| 6,433,831 B1 | 8/2002 | Dinwiddie et al. |
| 6,434,598 B1 | 8/2002 | Gish |
| 6,442,527 B1 | 8/2002 | Worthington |
| 6,456,304 B1 | 9/2002 | Angiulo et al. |
| 6,457,062 B1 | 9/2002 | Pivowar et al. |
| 6,459,441 B1 | 10/2002 | Perroux et al. |
| 6,466,236 B1 | 10/2002 | Pivowar et al. |
| 6,469,722 B1 | 10/2002 | Kinoe et al. |
| 6,469,723 B1 | 10/2002 | Gould |
| 6,480,865 B1 | 11/2002 | Lee et al. |
| 6,484,180 B1 | 11/2002 | Lyons et al. |
| 6,493,006 B1 | 12/2002 | Gourdol et al. |
| 6,493,731 B1 * | 12/2002 | Jones et al. ............... 715/234 |
| 6,507,845 B1 * | 1/2003 | Cohen et al. ............... 707/608 |
| 6,546,417 B1 | 4/2003 | Baker |
| 6,570,596 B2 | 5/2003 | Frederiksen |
| 6,578,192 B1 | 6/2003 | Boehme et al. |
| 6,583,798 B1 | 6/2003 | Hoek et al. |
| 6,584,501 B1 | 6/2003 | Cartsonis et al. |
| 6,618,732 B1 | 9/2003 | White et al. |
| 6,621,504 B1 | 9/2003 | Nadas et al. |
| 6,621,508 B1 | 9/2003 | Shiraishi et al. |
| 6,635,089 B1 | 10/2003 | Burkett et al. |
| 6,654,791 B1 | 11/2003 | Bates et al. |
| 6,664,983 B2 | 12/2003 | Ludolph |
| 6,680,749 B1 | 1/2004 | Anderson et al. |
| 6,686,938 B1 * | 2/2004 | Jobs et al. ............... 715/835 |
| 6,691,281 B1 | 2/2004 | Sorge et al. |
| 6,701,513 B1 | 3/2004 | Bailey |
| 6,707,454 B1 | 3/2004 | Barg et al. |
| 6,708,205 B2 | 3/2004 | Sheldon et al. |
| 6,721,402 B2 | 4/2004 | Usami |
| 6,727,919 B1 | 4/2004 | Reder et al. |
| 6,732,330 B1 | 5/2004 | Claussen et al. |
| 6,734,880 B2 | 5/2004 | Chang et al. |
| 6,750,850 B2 | 6/2004 | O'Leary |
| 6,750,890 B1 | 6/2004 | Sugimoto |
| 6,785,868 B1 | 8/2004 | Raff |
| 6,789,107 B1 | 9/2004 | Bates et al. |

(56) References Cited

U.S. PATENT DOCUMENTS

| | | | |
|---|---|---|---|
| 6,799,095 B1 | 9/2004 | Owen et al. | |
| 6,816,904 B1 | 11/2004 | Ludwig et al. | |
| 6,825,859 B1 | 11/2004 | Severenuk et al. | |
| 6,826,729 B1 | 11/2004 | Giesen et al. | |
| 6,850,255 B2 | 2/2005 | Muschetto | |
| 6,871,195 B2 | 3/2005 | Ryan et al. | |
| 6,882,354 B1 | 4/2005 | Nielsen | |
| 6,895,426 B1 | 5/2005 | Cortright et al. | |
| 6,904,449 B1 * | 6/2005 | Quinones | 709/203 |
| 6,906,717 B2 | 6/2005 | Couckuyt et al. | |
| 6,915,492 B2 | 7/2005 | Kurtenbach et al. | |
| 6,924,797 B1 | 8/2005 | MacPhail | |
| 6,925,605 B2 | 8/2005 | Bates et al. | |
| 6,928,613 B1 | 8/2005 | Ishii | |
| 6,941,304 B2 | 9/2005 | Gainey et al. | |
| 6,956,429 B1 | 10/2005 | Elbanhawy | |
| 6,964,025 B2 | 11/2005 | Angiulo et al. | |
| 6,983,889 B2 | 1/2006 | Alles | |
| 6,988,241 B1 | 1/2006 | Guttman et al. | |
| 6,990,637 B2 | 1/2006 | Anthony et al. | |
| 6,990,652 B1 | 1/2006 | Parthasarathy et al. | |
| 6,990,654 B2 | 1/2006 | Carroll, Jr. | |
| 7,027,463 B2 | 4/2006 | Mathew et al. | |
| 7,032,210 B2 | 4/2006 | Alloing et al. | |
| 7,039,596 B1 | 5/2006 | Lu | |
| 7,046,848 B1 | 5/2006 | Olcott | |
| 7,069,538 B1 | 6/2006 | Renshaw | |
| 7,107,544 B1 | 9/2006 | Luke | |
| 7,110,936 B2 | 9/2006 | Hiew et al. | |
| 7,111,238 B1 | 9/2006 | Kuppusamy et al. | |
| 7,117,370 B2 * | 10/2006 | Khan et al. | 713/186 |
| 7,134,095 B1 | 11/2006 | Smith et al. | |
| 7,149,983 B1 | 12/2006 | Robertson et al. | |
| 7,152,207 B1 | 12/2006 | Underwood et al. | |
| 7,181,697 B2 | 2/2007 | Tai et al. | |
| 7,188,073 B1 | 3/2007 | Tam et al. | |
| 7,188,317 B1 | 3/2007 | Hazel | 715/804 |
| 7,206,813 B2 | 4/2007 | Dunbar et al. | |
| 7,206,814 B2 | 4/2007 | Kirsch | |
| 7,212,208 B2 | 5/2007 | Khozai | |
| 7,216,301 B2 | 5/2007 | Moehrle | |
| 7,219,305 B2 | 5/2007 | Jennings | |
| 7,240,323 B1 | 7/2007 | Desai et al. | |
| 7,249,325 B1 | 7/2007 | Donaldson | |
| 7,263,668 B1 | 8/2007 | Lentz | |
| 7,290,033 B1 | 10/2007 | Goldman et al. | |
| 7,296,241 B2 | 11/2007 | Oshiro et al. | |
| 7,325,204 B2 | 1/2008 | Rogers | |
| 7,328,409 B2 | 2/2008 | Awada et al. | |
| 7,337,185 B2 | 2/2008 | Ellis et al. | |
| 7,346,705 B2 | 3/2008 | Hullot et al. | |
| 7,346,769 B2 | 3/2008 | Forlenza et al. | |
| 7,356,772 B2 | 4/2008 | Brownholtz et al. | 715/752 |
| 7,360,174 B2 | 4/2008 | Grossman et al. | |
| 7,386,535 B1 | 6/2008 | Kalucha et al. | |
| 7,386,835 B1 | 6/2008 | Desai et al. | |
| 7,392,249 B1 | 6/2008 | Harris et al. | |
| 7,395,221 B2 | 7/2008 | Doss et al. | |
| 7,395,500 B2 | 7/2008 | Whittle et al. | |
| 7,421,660 B2 | 9/2008 | Charnock et al. | |
| 7,421,690 B2 | 9/2008 | Forstall et al. | |
| 7,426,713 B2 | 9/2008 | Duggan et al. | |
| 7,469,385 B2 | 12/2008 | Harper et al. | |
| 7,472,117 B2 | 12/2008 | Dettinger et al. | |
| 7,484,213 B2 | 1/2009 | Mathew et al. | |
| 7,499,907 B2 | 3/2009 | Brown et al. | |
| 7,505,954 B2 | 3/2009 | Heidloff et al. | |
| 7,530,029 B2 | 5/2009 | Satterfield et al. | |
| 7,555,707 B1 | 6/2009 | Labarge et al. | |
| 7,567,964 B2 | 7/2009 | Brice et al. | |
| 7,584,253 B2 | 9/2009 | Curbow et al. | |
| 7,627,561 B2 | 12/2009 | Pell et al. | |
| 7,664,821 B1 | 2/2010 | Ancin et al. | 709/206 |
| 7,703,036 B2 | 4/2010 | Satterfield et al. | |
| 7,707,255 B2 | 4/2010 | Satterfield et al. | |
| 7,711,742 B2 | 5/2010 | Bennett et al. | |
| 7,716,593 B2 | 5/2010 | Durazo et al. | |
| 7,739,259 B2 | 6/2010 | Hartwell et al. | |
| 7,747,966 B2 | 6/2010 | Leukart et al. | |
| 7,788,598 B2 | 8/2010 | Bansal et al. | |
| 7,802,199 B2 | 9/2010 | Shneerson et al. | |
| 7,831,902 B2 | 11/2010 | Sourov et al. | 715/220 |
| 7,853,877 B2 | 12/2010 | Giesen et al. | |
| 7,865,868 B2 | 1/2011 | Schaw et al. | |
| 7,870,465 B2 | 1/2011 | VerSteeg | 714/774 |
| 7,886,290 B2 | 2/2011 | Dhanjal et al. | 717/170 |
| 7,895,531 B2 | 2/2011 | Radtke et al. | 715/810 |
| 8,117,542 B2 | 2/2012 | Radtke et al. | |
| 8,146,016 B2 | 3/2012 | Himberger et al. | |
| 8,150,930 B2 | 4/2012 | Satterfield et al. | |
| 8,201,103 B2 | 6/2012 | Dukhon et al. | |
| 8,239,882 B2 | 8/2012 | Dhanjal et al. | |
| 8,255,828 B2 | 8/2012 | Harris et al. | |
| 8,402,096 B2 | 3/2013 | Affronti et al. | |
| 8,484,578 B2 | 7/2013 | Gordner et al. | |
| 8,605,090 B2 | 12/2013 | Garg et al. | |
| 8,627,562 B2 | 1/2014 | Hartwell et al. | |
| 8,638,333 B2 | 1/2014 | Garg et al. | |
| 2001/0032220 A1 | 10/2001 | Van Hoff | 707/513 |
| 2001/0035882 A1 | 11/2001 | Stoakley et al. | |
| 2001/0049677 A1 | 12/2001 | Talib et al. | 707/3 |
| 2002/0007380 A1 | 1/2002 | Bauchot et al. | |
| 2002/0029247 A1 | 3/2002 | Kawamoto | |
| 2002/0037754 A1 | 3/2002 | Hama et al. | |
| 2002/0052721 A1 | 5/2002 | Ruff et al. | |
| 2002/0052880 A1 | 5/2002 | Fruensgaard et al. | |
| 2002/0054128 A1 | 5/2002 | Lau et al. | |
| 2002/0070977 A1 | 6/2002 | Morcos et al. | |
| 2002/0073156 A1 | 6/2002 | Newman | |
| 2002/0075330 A1 | 6/2002 | Rosenzweig et al. | |
| 2002/0078143 A1 | 6/2002 | De Boor et al. | |
| 2002/0083054 A1 | 6/2002 | Peltonen et al. | |
| 2002/0091697 A1 | 7/2002 | Huang et al. | |
| 2002/0091739 A1 * | 7/2002 | Ferlitsch et al. | 707/526 |
| 2002/0099775 A1 | 7/2002 | Gupta et al. | |
| 2002/0122071 A1 | 9/2002 | Camara et al. | |
| 2002/0123984 A1 | 9/2002 | Prakash | |
| 2002/0133557 A1 | 9/2002 | Winarski | |
| 2002/0135621 A1 | 9/2002 | Angiulo et al. | |
| 2002/0140731 A1 | 10/2002 | Subramaniam et al. | |
| 2002/0140740 A1 | 10/2002 | Chen | |
| 2002/0149623 A1 | 10/2002 | West et al. | |
| 2002/0149629 A1 | 10/2002 | Craycroft et al. | |
| 2002/0154178 A1 | 10/2002 | Barnett et al. | |
| 2002/0158876 A1 | 10/2002 | Janssen | |
| 2002/0163538 A1 | 11/2002 | Shteyn | |
| 2002/0175938 A1 | 11/2002 | Hackworth | 345/751 |
| 2002/0175955 A1 | 11/2002 | Gourdol et al. | |
| 2002/0186257 A1 | 12/2002 | Cadiz et al. | 715/764 |
| 2002/0196293 A1 | 12/2002 | Suppan et al. | |
| 2003/0005051 A1 | 1/2003 | Gottlieb | |
| 2003/0009455 A1 | 1/2003 | Carlson et al. | |
| 2003/0011564 A1 | 1/2003 | Ushino et al. | |
| 2003/0011638 A1 | 1/2003 | Chung | |
| 2003/0011639 A1 | 1/2003 | Webb | |
| 2003/0014421 A1 | 1/2003 | Jung | 707/102 |
| 2003/0014490 A1 | 1/2003 | Bates et al. | |
| 2003/0022700 A1 | 1/2003 | Wang | |
| 2003/0025732 A1 | 2/2003 | Prichard | |
| 2003/0025737 A1 | 2/2003 | Breinberg | |
| 2003/0035917 A1 | 2/2003 | Hyman | |
| 2003/0038832 A1 | 2/2003 | Sobol | |
| 2003/0043200 A1 | 3/2003 | Faieta et al. | |
| 2003/0043211 A1 | 3/2003 | Kremer et al. | |
| 2003/0046528 A1 | 3/2003 | Haitani et al. | |
| 2003/0050986 A1 * | 3/2003 | Matthews et al. | 709/206 |
| 2003/0066025 A1 | 4/2003 | Garner et al. | |
| 2003/0069892 A1 | 4/2003 | Hind et al. | |
| 2003/0069900 A1 | 4/2003 | Hind et al. | |
| 2003/0070143 A1 | 4/2003 | Maslov | |
| 2003/0084035 A1 | 5/2003 | Emerick | 707/3 |
| 2003/0093490 A1 | 5/2003 | Yamamoto et al. | |
| 2003/0097361 A1 | 5/2003 | Huang et al. | |
| 2003/0097640 A1 | 5/2003 | Abrams et al. | |

(56) References Cited

U.S. PATENT DOCUMENTS

| | | |
|---|---|---|
| 2003/0098891 A1 | 5/2003 | Molander |
| 2003/0106024 A1* | 6/2003 | Silverbrook et al. ......... 715/515 |
| 2003/0110191 A1 | 6/2003 | Handsaker et al. |
| 2003/0112278 A1 | 6/2003 | Driskell |
| 2003/0135825 A1 | 7/2003 | Gertner et al. |
| 2003/0156140 A1 | 8/2003 | Watanabe |
| 2003/0160821 A1 | 8/2003 | Yoon |
| 2003/0163455 A1 | 8/2003 | Dettinger et al. |
| 2003/0163537 A1 | 8/2003 | Rohall et al. ................. 709/206 |
| 2003/0167310 A1 | 9/2003 | Moody et al. |
| 2003/0169284 A1 | 9/2003 | Dettinger et al. |
| 2003/0195937 A1 | 10/2003 | Kircher et al. |
| 2003/0206646 A1 | 11/2003 | Brackett |
| 2003/0218611 A1 | 11/2003 | Ben-Tovim et al. |
| 2003/0226106 A1 | 12/2003 | McKellar et al. |
| 2003/0227487 A1 | 12/2003 | Hugh |
| 2003/0233419 A1 | 12/2003 | Beringer |
| 2004/0002941 A1 | 1/2004 | Thorne et al. |
| 2004/0003351 A1 | 1/2004 | Sommerer et al. |
| 2004/0006570 A1 | 1/2004 | Gelb et al. |
| 2004/0012633 A1 | 1/2004 | Helt |
| 2004/0021647 A1 | 2/2004 | Iwema et al. |
| 2004/0024824 A1 | 2/2004 | Ferguson et al. |
| 2004/0030993 A1 | 2/2004 | Hong Huey et al. |
| 2004/0056894 A1 | 3/2004 | Zaika et al. |
| 2004/0083432 A1 | 4/2004 | Kawamura et al. ........... 715/526 |
| 2004/0088359 A1 | 5/2004 | Simpson |
| 2004/0090315 A1 | 5/2004 | Mackjust et al. |
| 2004/0100504 A1 | 5/2004 | Sommer |
| 2004/0100505 A1 | 5/2004 | Cazier |
| 2004/0107197 A1* | 6/2004 | Shen et al. .................... 707/9 |
| 2004/0109025 A1 | 6/2004 | Hullot et al. |
| 2004/0109033 A1 | 6/2004 | Vienneau et al. |
| 2004/0117451 A1 | 6/2004 | Chung |
| 2004/0119755 A1 | 6/2004 | Guibourge |
| 2004/0119760 A1 | 6/2004 | Grossman et al. |
| 2004/0122789 A1 | 6/2004 | Ostertag et al. |
| 2004/0125142 A1 | 7/2004 | Mock et al. |
| 2004/0128275 A1 | 7/2004 | Moehrle |
| 2004/0133854 A1 | 7/2004 | Black |
| 2004/0142720 A1 | 7/2004 | Smethers |
| 2004/0153968 A1 | 8/2004 | Ching et al. |
| 2004/0164983 A1 | 8/2004 | Khozai |
| 2004/0168153 A1 | 8/2004 | Marvin |
| 2004/0186775 A1 | 9/2004 | Margiloff et al. |
| 2004/0189694 A1 | 9/2004 | Kurtz et al. |
| 2004/0192440 A1 | 9/2004 | Evans et al. |
| 2004/0205536 A1 | 10/2004 | Newman et al. |
| 2004/0212640 A1 | 10/2004 | Mann et al. |
| 2004/0215612 A1 | 10/2004 | Brody |
| 2004/0221234 A1 | 11/2004 | Imai |
| 2004/0230508 A1 | 11/2004 | Minnis et al. |
| 2004/0230906 A1 | 11/2004 | Pik et al. |
| 2004/0236796 A1 | 11/2004 | Bhatt et al. |
| 2004/0239700 A1 | 12/2004 | Baschy |
| 2004/0243938 A1 | 12/2004 | Weise et al. |
| 2004/0260756 A1 | 12/2004 | Forstall et al. |
| 2004/0261013 A1 | 12/2004 | Wynn et al. |
| 2004/0268231 A1 | 12/2004 | Tunning |
| 2004/0268270 A1 | 12/2004 | Hill et al. |
| 2005/0004989 A1 | 1/2005 | Satterfield et al. |
| 2005/0004990 A1 | 1/2005 | Durazo et al. |
| 2005/0005235 A1 | 1/2005 | Satterfield et al. |
| 2005/0005249 A1 | 1/2005 | Hill et al. |
| 2005/0010871 A1 | 1/2005 | Ruthfield et al. |
| 2005/0015361 A1 | 1/2005 | Payton et al. |
| 2005/0021504 A1 | 1/2005 | Atchison |
| 2005/0021521 A1 | 1/2005 | Wycoff |
| 2005/0022116 A1 | 1/2005 | Bowman et al. |
| 2005/0033614 A1 | 2/2005 | Lettovsky et al. |
| 2005/0039142 A1 | 2/2005 | Jalon et al. |
| 2005/0043015 A1 | 2/2005 | Muramatsu |
| 2005/0044500 A1 | 2/2005 | Orimoto et al. |
| 2005/0055449 A1 | 3/2005 | Rappold, III |
| 2005/0057584 A1 | 3/2005 | Gruen et al. |
| 2005/0086135 A1 | 4/2005 | Lu |
| 2005/0091576 A1* | 4/2005 | Relyea et al. ................. 715/502 |
| 2005/0097465 A1 | 5/2005 | Giesen et al. |
| 2005/0108348 A1* | 5/2005 | Lee ............... 709/207 |
| 2005/0114778 A1 | 5/2005 | Branson et al. |
| 2005/0117179 A1 | 6/2005 | Ito et al. ....................... 358/1.15 |
| 2005/0132010 A1 | 6/2005 | Muller |
| 2005/0132053 A1 | 6/2005 | Roth et al. .................... 709/227 |
| 2005/0138576 A1 | 6/2005 | Baumert et al. |
| 2005/0144241 A1 | 6/2005 | Stata et al. |
| 2005/0144284 A1 | 6/2005 | Ludwig et al. ................. 709/226 |
| 2005/0144568 A1 | 6/2005 | Gruen et al. ................. 715/822 |
| 2005/0172262 A1 | 8/2005 | Lalwani |
| 2005/0177789 A1 | 8/2005 | Abbar et al. .................. 705/528 |
| 2005/0183008 A1 | 8/2005 | Crider et al. |
| 2005/0185920 A1 | 8/2005 | Harper et al. |
| 2005/0203975 A1 | 9/2005 | Jindal et al. |
| 2005/0216863 A1 | 9/2005 | Schumacher et al. |
| 2005/0223057 A1 | 10/2005 | Buchheit et al. |
| 2005/0223066 A1 | 10/2005 | Buchheit et al. |
| 2005/0223329 A1 | 10/2005 | Schwartz et al. |
| 2005/0234910 A1 | 10/2005 | Buchheit et al. |
| 2005/0240902 A1 | 10/2005 | Bunker et al. |
| 2005/0251757 A1 | 11/2005 | Farn |
| 2005/0256867 A1 | 11/2005 | Walther et al. |
| 2005/0278656 A1 | 12/2005 | Goldthwaite et al. |
| 2005/0289109 A1 | 12/2005 | Arrouye et al. .................... 707/1 |
| 2005/0289156 A1 | 12/2005 | Maryka et al. |
| 2005/0289158 A1 | 12/2005 | Weiss et al. |
| 2006/0015816 A1 | 1/2006 | Kuehner et al. |
| 2006/0020962 A1 | 1/2006 | Stark |
| 2006/0026033 A1 | 2/2006 | Brydon et al. |
| 2006/0026213 A1* | 2/2006 | Yaskin et al. .................. 707/200 |
| 2006/0026242 A1 | 2/2006 | Kuhlmann et al. |
| 2006/0036580 A1 | 2/2006 | Stata et al. |
| 2006/0036945 A1* | 2/2006 | Radtke et al. ................. 715/708 |
| 2006/0036946 A1 | 2/2006 | Radtke et al. |
| 2006/0036950 A1 | 2/2006 | Himberger et al. |
| 2006/0036964 A1 | 2/2006 | Satterfield et al. |
| 2006/0036965 A1* | 2/2006 | Harris et al. .................. 715/777 |
| 2006/0041545 A1 | 2/2006 | Heidloff et al. |
| 2006/0047644 A1 | 3/2006 | Bocking et al. |
| 2006/0053383 A1 | 3/2006 | Gauthier et al. |
| 2006/0064434 A1* | 3/2006 | Gilbert et al. .............. 707/104.1 |
| 2006/0069604 A1 | 3/2006 | Leukart et al. |
| 2006/0069686 A1 | 3/2006 | Beyda et al. |
| 2006/0074844 A1 | 4/2006 | Frankel et al. |
| 2006/0080303 A1 | 4/2006 | Sargent et al. |
| 2006/0085502 A1 | 4/2006 | Sundararajan et al. |
| 2006/0095865 A1 | 5/2006 | Rostom |
| 2006/0101051 A1 | 5/2006 | Carr et al. |
| 2006/0101350 A1 | 5/2006 | Scott |
| 2006/0111931 A1 | 5/2006 | Johnson et al. |
| 2006/0117249 A1 | 6/2006 | Hu et al. |
| 2006/0117302 A1 | 6/2006 | Mercer et al. |
| 2006/0129937 A1 | 6/2006 | Shafron |
| 2006/0132812 A1 | 6/2006 | Barnes et al. ................. 358/1.11 |
| 2006/0155689 A1 | 7/2006 | Blakeley et al. |
| 2006/0161849 A1 | 7/2006 | Miller et al. ................. 715/744 |
| 2006/0161863 A1 | 7/2006 | Gallo |
| 2006/0168522 A1 | 7/2006 | Bala |
| 2006/0173824 A1 | 8/2006 | Bensky |
| 2006/0173961 A1 | 8/2006 | Turski et al. |
| 2006/0218500 A1* | 9/2006 | Sauve et al. .................. 715/767 |
| 2006/0242557 A1 | 10/2006 | Nortis, III |
| 2006/0242575 A1 | 10/2006 | Winser ........................ 715/235 |
| 2006/0248012 A1 | 11/2006 | Kircher et al. |
| 2006/0259449 A1 | 11/2006 | Betz et al. |
| 2006/0271869 A1 | 11/2006 | Thanu et al. .................. 715/764 |
| 2006/0271910 A1 | 11/2006 | Burcham et al. |
| 2006/0282817 A1 | 12/2006 | Darst et al. |
| 2006/0294452 A1 | 12/2006 | Matsumoto |
| 2006/0294526 A1 | 12/2006 | Hambrick et al. |
| 2007/0006206 A1 | 1/2007 | Dhanjal et al. |
| 2007/0011258 A1 | 1/2007 | Khoo |
| 2007/0033250 A1 | 2/2007 | Levin et al. |
| 2007/0050182 A1 | 3/2007 | Sneddon et al. .................. 704/2 |
| 2007/0050401 A1 | 3/2007 | Young et al. |
| 2007/0055936 A1 | 3/2007 | Dhanjal et al. |

(56) References Cited

U.S. PATENT DOCUMENTS

| | | | |
|---|---|---|---|
| 2007/0055943 A1 | 3/2007 | McCormack et al. | |
| 2007/0061306 A1 | 3/2007 | Pell et al. | |
| 2007/0061307 A1 | 3/2007 | Hartwell et al. | |
| 2007/0061308 A1 | 3/2007 | Hartwell et al. | |
| 2007/0061738 A1 | 3/2007 | Taboada et al. | |
| 2007/0094230 A1 | 4/2007 | Subramaniam et al. | |
| 2007/0106951 A1 | 5/2007 | McCormack et al. | 715/764 |
| 2007/0124696 A1 | 5/2007 | Mullender et al. | |
| 2007/0143662 A1 | 6/2007 | Carlson et al. | |
| 2007/0143671 A1 | 6/2007 | Paterson et al. | |
| 2007/0180040 A1 | 8/2007 | Etgen et al. | 709/207 |
| 2007/0185826 A1 | 8/2007 | Brice et al. | |
| 2007/0203991 A1 | 8/2007 | Fisher et al. | |
| 2007/0240057 A1 | 10/2007 | Satterfield et al. | |
| 2007/0260996 A1 | 11/2007 | Jakobson | |
| 2007/0266017 A1 | 11/2007 | Held et al. | |
| 2007/0279417 A1 | 12/2007 | Garg et al. | |
| 2007/0282956 A1 | 12/2007 | Staats | 709/206 |
| 2007/0300168 A1 | 12/2007 | Bosma et al. | |
| 2008/0005274 A1 | 1/2008 | Khoo | |
| 2008/0005686 A1 | 1/2008 | Singh | |
| 2008/0034304 A1 | 2/2008 | Feuerbacher et al. | |
| 2008/0040682 A1 | 2/2008 | Sorenson et al. | |
| 2008/0052670 A1 | 2/2008 | Espinosa et al. | |
| 2008/0077571 A1 | 3/2008 | Harris et al. | |
| 2008/0104505 A1 | 5/2008 | Keohane et al. | 715/246 |
| 2008/0109787 A1 | 5/2008 | Wang et al. | |
| 2008/0134138 A1 | 6/2008 | Chamieh et al. | |
| 2008/0141242 A1 | 6/2008 | Shapiro | 717/174 |
| 2008/0155555 A1 | 6/2008 | Kwong | |
| 2008/0178110 A1 | 7/2008 | Hill et al. | |
| 2008/0244440 A1 | 10/2008 | Bailey | |
| 2009/0007003 A1 | 1/2009 | Dukhon et al. | |
| 2009/0012984 A1 | 1/2009 | Ravid et al. | 707/101 |
| 2009/0100009 A1 | 4/2009 | Karp | |
| 2009/0106375 A1 | 4/2009 | Carmel et al. | 709/206 |
| 2009/0144651 A1 | 6/2009 | Sprang et al. | |
| 2009/0152349 A1 | 6/2009 | Bonev et al. | |
| 2009/0158173 A1 | 6/2009 | Palahnuk et al. | |
| 2009/0192845 A1 | 7/2009 | Gudipaty et al. | |
| 2009/0217192 A1 | 8/2009 | Dean et al. | |
| 2009/0222763 A1 | 9/2009 | Dukhon et al. | |
| 2009/0319619 A1 | 12/2009 | Affronti et al. | |
| 2009/0319911 A1 | 12/2009 | McCann | |
| 2010/0011310 A1 | 1/2010 | Rainisto | |
| 2010/0060645 A1 | 3/2010 | Garg et al. | |
| 2010/0180226 A1 | 7/2010 | Satterfield et al. | |
| 2010/0191818 A1 | 7/2010 | Satterfield et al. | |
| 2010/0199261 A1 | 8/2010 | Shenfield et al. | |
| 2010/0211889 A1 | 8/2010 | Durazo et al. | |
| 2010/0223575 A1 | 9/2010 | Leukart et al. | |
| 2010/0293470 A1 | 11/2010 | Zhao et al. | |
| 2011/0055673 A1* | 3/2011 | Teng et al. | 715/200 |
| 2011/0072396 A1 | 3/2011 | Giesen et al. | 715/841 |
| 2011/0138273 A1 | 6/2011 | Radtke et al. | 715/256 |
| 2011/0225249 A1 | 9/2011 | Forstall et al. | |
| 2011/0296322 A1 | 12/2011 | Dhanjal et al. | 715/760 |
| 2012/0179993 A1 | 7/2012 | Himberger et al. | |
| 2012/0215866 A1 | 8/2012 | Satterfield et al. | |
| 2012/0324394 A1 | 12/2012 | Harris et al. | |
| 2013/0014048 A1 | 1/2013 | Satterfield et al. | |
| 2013/0159879 A1 | 6/2013 | Affronti et al. | |

FOREIGN PATENT DOCUMENTS

| | | | |
|---|---|---|---|
| CN | 1746914 | 3/2006 | |
| CN | 101243439 | 6/2012 | |
| CN | 102067166 | 6/2013 | |
| CN | 102317897 | 7/2013 | |
| CN | 102077163 | 10/2013 | |
| CN | 102077199 B | 1/2014 | |
| EP | 0 910 007 | 4/1999 | |
| EP | 1 077 405 A2 | 2/2001 | |
| EP | 1 104 151 | 5/2001 | |
| EP | 1 672 518 | 6/2001 | |
| EP | 1 223 503 | 7/2002 | |
| EP | 1 376 337 | 1/2004 | |
| EP | 1 462 999 A2 | 9/2004 | |
| EP | 1 542 133 A2 | 6/2005 | |
| EP | 1 564 652 | 8/2005 | |
| EP | 1 628 197 | 2/2006 | |
| EP | 1 628 198 | 2/2006 | |
| EP | 1 628 199 | 2/2006 | |
| EP | 1 645 972 | 4/2006 | |
| EP | 1 835 434 A1 | 9/2007 | |
| EP | 1 915 001 | 4/2008 | |
| GB | 2329813 | 3/1999 | |
| GB | 2 391 148 | 1/2004 | |
| ID | P 0027717 | 3/2011 | |
| ID | P 0027754 | 3/2011 | |
| ID | P 0029297 | 10/2011 | |
| JP | 03-043824 | 2/1991 | |
| JP | 04-186425 | 3/1992 | |
| JP | 04-312186 | 11/1992 | |
| JP | 05-204579 | 8/1993 | |
| JP | 06-052282 | 2/1994 | |
| JP | 06-342357 | 12/1994 | |
| JP | 09-204289 | 8/1997 | |
| JP | 10-074217 | 3/1998 | |
| JP | 10-326171 | 12/1998 | |
| JP | 11-039292 | 2/1999 | |
| JP | 11-175258 | 7/1999 | |
| JP | 11-259200 | 9/1999 | |
| JP | 2001-034775 | 2/2001 | |
| JP | 2001-503893 | 3/2001 | |
| JP | 2001-109673 | 4/2001 | |
| JP | 2001-222477 | 8/2001 | |
| JP | 2001-337944 | 12/2001 | |
| JP | 2003-015719 | 1/2003 | |
| JP | 2003-198630 | 3/2003 | |
| JP | 2003-101768 | 4/2003 | |
| JP | 2003-256258 | 9/2003 | |
| JP | 2003-256302 | 9/2003 | |
| JP | 2004-078512 | 3/2004 | G06F 17/30 |
| JP | 2004-086893 | 3/2004 | |
| JP | 2004-102803 | 4/2004 | G06F 17/30 |
| JP | 2004-512578 | 4/2004 | |
| JP | 2004-145569 | 5/2004 | G06F 17/21 |
| JP | 2004-159261 | 6/2004 | |
| JP | 2004-342115 | 12/2004 | |
| JP | 2005-025550 | 1/2005 | |
| JP | 2005-032041 | 2/2005 | |
| JP | 2005-182353 | 7/2005 | G06F 17/30 |
| JP | 2005-352849 | 12/2005 | |
| JP | 2007-280180 | 10/2007 | |
| JP | 2007-531165 | 11/2007 | |
| JP | 2008-047067 | 2/2008 | |
| JP | 2008-117019 A | 5/2008 | |
| JP | 2005-236089 | 9/2011 | |
| JP | 4832024 | 9/2011 | |
| JP | 5021185 | 6/2012 | |
| JP | 5079701 | 9/2012 | |
| JP | 5139984 | 11/2012 | |
| JP | 5190452 | 2/2013 | |
| JP | 5193042 | 2/2013 | |
| JP | 5221757 | 3/2013 | |
| JP | 5266384 | 5/2013 | |
| KR | 10-2005-0023805 A | 3/2005 | |
| KR | 10-2005-0036702 A | 4/2005 | |
| KR | 10-1130421 | 3/2012 | |
| KR | 10-1149960 | 5/2012 | |
| KR | 10-1149990 | 5/2012 | |
| KR | 10-1159334 | 6/2012 | |
| KR | 10-1238559 | 2/2013 | |
| KR | 10-1298338 | 8/2013 | |
| KR | 10-1298461 | 8/2013 | |
| KR | 10-1312867 | 9/2013 | |
| KR | 10-1323011 | 10/2013 | |
| MY | 146456 | 8/2012 | |
| MY | 147334 | 7/2013 | |
| MY | 149803 | 10/2013 | |
| PH | 1-2005-000404 | 8/2011 | |
| RU | 20051120362 | 1/2007 | |

(56) References Cited

FOREIGN PATENT DOCUMENTS

| | | |
|---|---|---|
| RU | 2322687 | 4/2008 |
| RU | 2328034 | 6/2008 |
| TW | 460839 | 10/2001 |
| TW | 490652 | 6/2002 |
| TW | 2003-05097 | 10/2003 |
| TW | 1368852 | 7/2012 |
| TW | 1389002 | 3/2013 |
| TW | 1389043 | 3/2013 |
| TW | 1401577 | 7/2013 |
| WO | 94-20921 | 9/1994 |
| WO | 96/10231 | 4/1996 |
| WO | 96-39654 | 12/1996 |
| WO | 98/20410 | 5/1998 |
| WO | WO 99/04353 | 1/1999 |
| WO | WO 99/27495 | 6/1999 |
| WO | WO 01/55894 | 8/2001 |
| WO | WO 02/091162 A3 | 11/2002 |
| WO | WO 03/003240 A2 | 1/2003 |
| WO | WO 03/098500 | 11/2003 |
| WO | 2007-030727 A3 | 3/2007 |
| WO | WO 2007/033159 A1 | 3/2007 |
| WO | WO 2007/027737 A1 | 8/2007 |
| WO | 2008/027477 | 3/2008 |
| WO | WO 2008/121718 A1 | 10/2008 |
| WO | 2009-158151 | 12/2009 |
| WO | 2009-158171 | 12/2009 |
| WO | 2009-158172 | 12/2009 |
| ZA | 2010/07809 | 2/2012 |
| ZA | 2010/07810 | 2/2012 |
| ZA | 2011/04850 | 12/2012 |

OTHER PUBLICATIONS

U.S. Appl. No. 12/753,923, filed Apr. 5, 2010 entitled "Automatic Grouping of Electronic Mail".
U.S. Appl. No. 12/769,787, filed Apr. 29, 2010 entitled "Conversation Grouping of Electronic Mail Records".
U.S. Appl. No. 12/777,287, filed May 11, 2010 entitled "User Interface for Providing Task Management and Calendar Information".
U.S. Appl. No. 11/217,071, filed Aug. 30, 2005 entitled "Markup Based Extensibility for User Interfaces".
Charles Rich et al., "Segmented Interaction History in a Collaborative Interface Agent," 1997, ACM, pp. 23-30.
Andrew Dwelly, "Functions and Dynamic User Interface," 1989, ACM, pp. 371-381.
G. Kurtenbach et al., "The Hotbox: Efficient Access to a Large Number of Menu-items," CHI 99 15-20, pp. 231-237, May 1999.
Charles Rich et al., "Adding a Collaborative Agent to Graphical User Interfaces," 1996, ACM, pp. 21-30.
Boyce, "Microsoft Outlook Inside Out," 2001, pp. 67, 68, 109, 110, 230, 231, 310, 316-318, 798.
Halvorson et al., "Microsoft Office XP Inside Out," 2001, pp. 1005-1009, 1015, 1023-1028, 1036-1039, 1093.
Riggsby et al., "Mastering Lotus Notes and Domino 6," 2003, pp. 135-139.
Riggsby et al., "Mastering Lotus Notes and Domino 6," 2003, pp. 135-138, 607-612.
Khare et al., "The Origin of (Document) Species," University of California, 1998, 9 pgs.
"Separate Structure and Presentation," http://www.webreference.com/html/tutorial5/1.html, Aug. 20, 1998, 4 pgs.
"The Style Attribute and CSS Declarations," http://www.webreference.com/html/tutorial5/2, Aug. 20, 1998, 4 pgs.
"What's Hot in Internet Services?" http://www.webreference.com/html/tutoria15/3, Aug. 20, 1998, 3 pgs.
"The Style Element & CSS Selectors," http://www.webreference.com/html/tutorial5/4.html, Aug. 20, 1998, 3 pgs.
http://www.webreference.com/html/tutorial5/5.html, Aug. 20, 1998, 3 pgs.
"ID & Class Selectors, Pseudoclasses," http://www.webreference.com/html/tutorial5/6.html, Aug. 20, 1998, 3 pgs.
http://www.webreference.com/html/tutorial5/7.html, Aug. 20, 1998, 3 pgs.
http://www.webreference.com/html/tutorial5/8.html, Aug. 20, 1998, 2 pgs.
"External Style Sheets," http://www.webreference.com/html/tutorial5/9.html, Aug. 20, 1998, 3 pgs.
Raman, "Cascaded Speech Style Sheets," 1997, 7 pgs.
"Primary Windows," Accessed at http://www-03.ibm.com/servers/eserver/iseries/navigator/guidelines/primary.html on Feb. 23, 2007, 23 pgs.
Schumaker, "User Interface Standards," http://msdn2.microsoft.com/en-us/library/aa217660(office.11.d=printer).aspx, Sep. 2001, 5 pgs.
Budinsky et al., "WebSphere Studio Overview," http://researchweb.watson.ibm.com/journal/sj/432/budinsky.html, May 6, 2004, 25 pgs.
Gordon Padwick, Using Microsoft Outlook 2000, Que, Sp. Ed., May 1999, 5 pp.
Becker et al., "Virtual Folders: Database Support for Electronic Messages Classification," Pontificia Universidade Catolica do Rio Grande do Sul, Porto Alegre, Brazil, pp. 163-170.
Goldberg et al., "Using Collaborative Filtering to Weave an Information Tapestry," Communication of the ACM, vol. 35, No. 12, pp. 61-70, Dec. 1992.
Liu et al., "Continual Queries for Internet Scale Event-Driven Information Delivery," IEEE Transactions on Knowledge and Data Engineering, vol. 11, Issue 1, pp. 610-628, 1999.
Chen et al., "NiagaraCQ: A Scalable Continuous Query System for Internet Databases," Int. Conf. on Management of Data, Proc. of the 2000 ACM SIGMOD Int. Conf. on Management of Data, pp. 379-390, 2000.
Marshall School of Business: "Workshop IV—Calendar," http://www.marshall.usc.edu/computing/PDF_Files/Outlook/Workshop4, PDF, Apr. 10, 2000, pp. 1-4.
M. Williams, "Programming Windows NT4: Unleashed," Sams Publishing, Indianapolis, 1996, pp. index & 167-185.
"Microsoft Outlook 2000: Introduction to Calendar," Version 2002.03.25, http://www.uakron.edu/its/learning/training/docs/Calendar032502.pdf, Mar. 25, 2002, pp. 1-52.
Screen Dumps of Microsoft Outlook (1999, pp. 1-3).
"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.
Microsoft Windows XP Professional, Version 2002, Service pack 2, 3 pgs.
Camarda, Using Microsoft Word 97, copyright 1997, QUE Corporation, pp. 412, 869.
Marshall School of Business, Workshop 1—Introduction to Outlook & E-mail, Apr. 6, 2000, pp. 1-11.
Jane Dorothy Calabria Burke, Ten Minute Guide to Lotus Notes 4.6, Publication date: Dec. 23, 1997, 2 pgs.
Bill Dyszel, Microsoft Outlook 2000 for Windows for Dummies, Copyright 1999, pp. 82-86, 102-103, 141,143.
Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.
Screen Dumps Microsoft Corporation, Microsoft Office Professional Edition 2003, 4 pp.
Screen Dumps Microsoft Corporation, Microsoft Office Professional Edition 2003, 5 pp.
Habraken, Microsoft Office XP 8 in 1, published Jun. 5, 2001, http://proquest.safaribooksonline.com/0789725096/, 12 pp.
Word 2002, Chapter 14; Paradigm Publishing Inc., copyright 2002; http://www.emcp.com/tech_tutorials/sig_irc/Signature_Word_Chapter_14.ppt, 21 pp.
Microsoft Office Word 2003, Part of Microsoft Office Professional Edition 2003, 1983-2003 Microsoft Corporation, 5 pp.

(56) References Cited

OTHER PUBLICATIONS

Microsoft Office 11 Beta Layperson's Specification, Copyright 2002, Microsoft Corporation, 28 pages.
FrontPage 11 Beta Layperson's Specification, Copyright 2002, Microsoft Corporation, 12 pages.
Office 11 Beta Letter, Copyright 2002, Microsoft Corporation, 6 pages.
Microsoft XDocs Beta Layperson Specification, Copyright 2002, Microsoft Corporation, 3 pages.
Microsoft Publisher 11 Beta Layperson's Specification, Copyright 2002, Microsoft Corporation, 13 pages.
Microsoft Office Word 2003, Part of Microsoft Office Professional Edition 2003, 1983-2003 Microsoft Corporation, screen shot 1, 1 pp.
Microsoft Office 2003, Microsoft Office Professional Edition 2003, Microsoft Corporation, 10 pages.
Screendumps—Microsoft Office, Microsoft Office Professional Edition 2003, Microsoft Corporation, 10 pages.
Screendumps—Microsoft Office Outlook, Microsoft Office Outlook Professional Edition 2003, Microsoft Corporation, 2 pages.
Nielsen, Jacob. "Tabs, Used Right," Alertbox, Sep. 17, 2007, http://www.useit.com/alertbox/tabs.html, 6 pages.
"Managing the Code Editor and View" Microsoft Corporation, http://msdn.microsoft.com/en-us/library/z01zks9a(VS.71).aspx, 2008.
Agarwal, Vikash K., "Creating a Visually Arresting User-Interface: A3D Tab Control Example," Jan. 4, 2008, http://microsoft.apress.com/asptodayarchive/71723/creating-a-visually-arresting-user-interface-a-3d-tab-control-example, 12 pages.
"Omni Web Help," Omni Group, 2004, http://www.omnigroup.com/documentation/omniweb/browser/tabs.html, 2 pages.
Hepfner, Troy, "New SOCET CXP Interface Improves Usability," Sep. 2008, http://www.socetset.com/gxpmosaic/?p=95, 4 pages.
Billo, E. Joseph. "Creating Charts: An Introduction," Excel for Chemists: . A Comprehensive Guide, http://www.ahut.edu.cn/yxsz/ahk/Teaching/Excel%for%20Chemists/ChQ2.pdf, 9 pages.
Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf, 7 pages.
"TeeChart for .NET Charting Control," Steema Software; accessed at: http://www.teechart.net/; accessed on Jan. 11, 2006.
Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.
Lisa K. Averett; Joshua R. Knisley; Mark A. Marvin; Haiti: Projecting Tactical Network and Systems Management; 1995 IEEE pp. 906-910.
Boyce, "Microsoft Outlook Inside Out," 2001, pp. 133, 134, 721-728.
Halvorson et al., "Microsoft Office XP Inside Out," 2001, pp. 4, 5, 10, 11, 70-74, 281-288, 1010-1014.
Pogue, David. "Windows XP Home Edition: The Missing Manual," O'Reilly, 1st Edition, May 1, 2002, pp. 37, 38, 41.
Screendumps—Microsoft Office, Microsoft Corporation, Microsoft Office Professional Edition 2003, 13 pages.
Berliner E.M. et al., "Microsoft Office 2003", Feb. 24, 2004, p. 39-40, 120-124, 175-177, 233-234 [D1].
Berliner E.M. et al., "Microsoft Office 2003", Feb. 24, 2004, p. 173-178 [D2].
Perronne et al. "Building Java Enterprise Systems with J2EE", Publisher: Sams, Pub Date: Jun. 7, 2000 (pp. 1-8).
Padwick, Gordon "Using Microsoft Outlook 2000", 1999 Que Publishing, pp. 530-533.
Slovak, Ken, "Absolute Beginner's Guide to Microsoft Office Outlook 2003," 2003 Que Publishing, pp. 237-241.
Microsoft Press, Microsoft Computer Dictionary, Microsoft Press, Fifth Edition, 2002, pp. 374, 382.
Riggsby, McCoy, Haberman and Falciani, "Mastering Lotus Notes and Domino 6." 2003, pp. 18, 22, 33-35, 47, 122, 123, 215-241, 378.
Find any file or email on your PC as fast as you can type!, http://www.x1.com, 2003, 1 page.
"About Google Desktop Search", http://www.desktop.google.com/about.html, Oct. 15, 2004, 8 pages.
"Lookout", http://www.lookoutsoft.com, Apr. 22, 2005, 20 pages.
"Yahoo to test desktop search", http://news.com.com/yahoo+to+test+desktop+searcach/2100-1032_3-5486381.html, Dec. 9, 2004, 6 pages.
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0.1895.1771841.00.asp, Mar. 2, 2005.
"Windows Desktop Search". Http://kunal.kundale.net/reviews/wds.html, Jul. 10, 2005, 7 pages.
"Microsoft Enters Desktop Search Fray", http://www.internetnews.com/ent-news/article.php/3447331, Dec. 13, 2004, 5 pages.
Screendumps—Microsoft Office (Microsoft Corporation, Microsoft Office Professional Edition 2003; 16 pages).
Clifton, The Application Automation layer—Using XML to Dynamically Generale GUI Elements—forms and controls, The Code Project, Jun. 2003, pp. 1-37.
ScreenShot of MS_Office_2003; (Microsoft Corporation, Microsoft Office Professional Edition 2003; 6 pages).
Halvorson et al., Microsoft Office Professional Official Manual, Aug. 20, 2002, 10 pgs.
Danish Written Opinion Appl. No. SG 200504508-3 dated Sep. 18, 2006.
Danish Search Report Appl. No. SG 200504475-5 dated Sep. 19, 2006.
New Zealand Application No. 541301, Examination Report dated Jul. 25, 2005.
New Zealand Application No. 541300, Examination Report dated Jul. 25, 2005.
New Zealand Application No. 541299, Examination Report dated Jul. 25, 2005.
Australian Search Report dated Jan. 16, 2007 cited in Singapore Application No. 200504474-8.
PCT Written Opinion and Search Report dated Jan. 9, 2007 cited in International Application No. PCT/US2006/033809.
PCT Search Report dated Feb. 6, 2007 cited in International Application No. PCT/US2006/035467.
PCT Search Report dated Feb. 26, 2007 cited in International Application No. PCT/US2006/034993.
European Communicated dated Oct. 20, 2005 cited in EP Application No. 04102463.0/2211 PCT/.
International Search Report dated Oct. 17, 2007 cited in International Application No. PCT/US2006/012724.
International Search Report dated Nov. 27, 2007 in PCT/US2007/012573, 9 pages.
Australian Written Opinion/Search Report Singapore Application No. 200505257-6 mailed Feb. 12, 2007.
Chinese First Office Action dated Mar. 21, 2008 cited in Appln No. 200510092146.4.
Chinese First Office Action dated Mar. 21, 2008 cited in Appl No. 200510092139.4.
Chinese First Office Action dated Apr. 11, 2008 cited in Appl No. 20050092141.1.
Chinese First Office Action dated Apr. 18, 2008 cited in Appl No. 200510092142.6.
Philippines Examiner's Action dated Apr. 21, 2008 cited in Appl No. 1-2005-000405.
Philippines Examiner's Action dated Apr. 21, 2008 cited in Appl No. 1-2005-000406.
Chilean Office Action dated Mar. 28, 2008 cited in Appln No. 1770-05, no English Translation.
Chinese First Office Action dated May 23, 2008 cited in Appln No. 200510089514.X.
European Summons to Attend Oral Proceedings dated Jun. 23, 2008 cited in Appln No. 04102463.9.
Philippines Examiner's Action dated Jul. 31, 2008 cited in Appln No. 12005000495.
Philippines Examiner's Action dated Aug. 19, 2008 cited in Appln No. 12005000405.
Philippines Examiner's Action dated Sep. 12, 2008 cited in Appln No. 1200500406.

(56) References Cited

OTHER PUBLICATIONS

Chinese Second Office Action dated Oct. 10, 2008 cited in Appln No. 200510092141.1.
Chinese Second Office Action dated Oct. 17, 2008 cited in Appln No. 200510092139.4.
Chinese Second Office Action dated Nov. 21, 2008 cited in Appln No. 200510089514.X.
Chilean Office Action dated Nov. 27, 2008 cited in Appln No. 1768-2005.
Chilean Office Actin dated Sep. 23, 2008 cited in Appln No. 1770-2005.
Chilean Office Action dated Nov. 27, 2008 cited in Appln No. 1769-2005.
Mexican Office Action dated Feb. 5, 2009 cited in Appln No. PA/a/2005/008349.
Mexican Office Action dated Mar. 3, 2009 cited in Appln No. PA/a/2005/008351 English language only.
Chilean Second Office Action dated Mar. 4, 2009 cited in Appln No. 2512-2005.
European Office Action mailed Mar. 9, 2009, Application No. 06790087.8.
Chinese Office Action dated Apr. 3, 2009 cited in Appln No. 200510089514.X.
Supplementary European Search Report dated Jun. 9, 2009 cited in EP Application No. 07795391.7-1225.
Chinese Third Office Action dated Jun. 19, 2009 cited in Appln No. 200510092139.4.
Mexican Office Action dated Jun. 19, 2009 cited in Appln. No. PA/a/2005/007073.
Russian Office Action dated Jun. 24, 2009 cited in Appln No. 2005120363/28(023023).
Chinese Office Action dated Jul. 3, 2009 cited in Appln. No. 200680018095.3.
Russian Office Action dated Jul. 21, 2009 cited in Appln No. 2005125837/09(029011).
Russian Office Action dated Jul. 30, 2009 cited in Appln No. 2005125831/09(029005).
Israeli Office Action dated Sep. 6, 2009 cited in Appln No. 169716.
Israeli Office Action dated Sep. 7, 2009 cited in Appln No. 169718.
European Search Report dated Sep. 7, 2009 cited in EP Application No. 09006972.5-2211.
Russian Office Action dated Sep. 10, 2009 cited in Appln No. 2005125836/09(029010).
Russian Office Action dated Sep. 10, 2009 cited in Appln No. 2005125839/09(029013).
European Communication dated Sep. 14, 2009 cited in Appln. No. 07795391.7-1225.
European Communication dated Sep. 28, 2009 cited in Appln No. 09006972.5-2211.
Chinese Office Action dated Oct. 16, 2009 cited in Appln No. 200510092142.6.
Russian Office Action dated Oct. 26, 2009 cited in Appln No. 2005120363/09(023023).
Russian Office Action dated Oct. 30, 2009 cited in Appln No. 2005125837/09(029011).
Chilean Second Office Action dated Nov. 4, 2009 cited in Appln No. 1770-2005.
Chinese Office Action dated Nov. 27, 2009 cited in Appln No. 200680033212.3.
PCT Search Report and Written Opinion dated Nov. 30, 2009 cited in International Application No. PCT/US2009/046341.
Chilean Second Office Action dated Dec. 4, 2009 cited in Appln No. 1768-2005.
Russian Office Action dated Dec. 28, 2009 cited in Appln No. 2005125836/09(029010).
Chinese Office Action dated Jan. 22, 2010 cited in Appln No. 200680032564.7.
Chilean Second Office Action dated Jan. 29, 2010 cited in Appln No. 1769-2005.
Chinese Third Office Action dated Feb. 12, 2010 cited in Appln No. 200510092142.6.
Philippines Examiner's Action dated Mar. 11, 2010 cited in Appln No. 1-2005-000405.
Chinese Office Action dated Mar. 11, 2010 cited in Appln No. 200780020312.7.
Australian Office Action dated Mar. 25, 2010 cited in Appln No. 2005203411.
Australian Office Action dated Mar. 25, 2010 cited in Appln No. 2005203412.
Australian Office Action dated Mar. 26, 2010 cited in Appln No. 2005203409.
Australian Office Action dated Apr. 8, 2010 cited in Appln No. 2005203410.
Australian Office Action dated May 28, 2010 cited in Appln No. 2005202717.
Chinese Second Office Action dated Jul. 6, 2010 cited in Appln No. 200680033212.3.
Mexican Office Action dated Aug. 12, 2010 cited in Appln No. 2005/008354.
U.S. Official Action dated Dec. 23, 2003 in U.S. Appl. No. 09/896,384.
U.S. Official Action dated Apr. 27, 2006 in U.S. Appl. No. 10/800,056.
U.S. Official Action dated Jul. 26, 2006 in U.S. Appl. No. 10/741,407.
U.S. Final Official Action dated Oct. 19, 2006 in U.S. Appl. No. 10/800,056.
U.S. Official Action dated Jan. 4, 2007 in U.S. Appl. No. 10/607,020.
U.S. Final Official Action dated Jan. 23, 2007 in U.S. Appl. No. 10/741,407.
U.S. Official Action dated Apr. 12, 2007 cited in U.S. Appl. No. 10/851,506.
U.S. Official Action dated Jun. 4, 2007 in U.S. Appl. No. 10/955,940.
U.S. Official Action dated Jun. 14, 2007 in U.S. Appl. No. 10/836,154.
U.S. Official Action dated Jun. 21, 2007 in U.S. Appl. No. 10/955,928.
U.S. Official Action dated Jul. 11, 2007 in U.S. Appl. No. 10/955,941.
U.S. Official Action dated Jul. 11, 2007 in U.S. Appl. No. 10/955,967.
U.S. Official Action dated Jul. 11, 2007 in U.S. Appl. No. 10/955,942.
U.S. Official Action dated Jul. 13, 2007 in U.S. Appl. No. 10/800,056.
U.S. Official Action dated Sep. 6, 2007 in U.S. Appl. No. 11/136,800.
U.S. Official Action dated Sep. 26, 2007 in U.S. Appl. No. 11/151,686.
U.S. Official Action dated Oct. 9, 2007 in U.S. Appl. No. 10/982,073.
U.S. Official Action dated Dec. 4, 2007 in U.S. Appl. No. 10/955,940.
U.S. Official Action dated Dec. 21, 2007 in U.S. Appl. No. 10/851,506.
U.S. Official Action dated Dec. 28, 2007 in U.S. Appl. No. 10/800,056.
U.S. Official Action dated Jan. 8, 2008 in U.S. Appl. No. 10/955,928.
U.S. Final Official Action dated Jan. 28, 2008 cited in U.S. Appl. No. 10/836,154.
U.S. Official Action dated Feb. 20, 2008 cited in U.S. Appl. No. 10/848,774.
U.S. Official Action dated Feb. 21, 2008 cited in U.S. Appl. No. 10/851,442.
U.S. Official Action dated Feb. 22, 2008 in U.S. Appl. No. 11/445,393.
U.S. Official Action dated Apr. 15, 2008 cited in U.S. Appl. No. 10/955,942.
U.S. Official Action dated Apr. 16, 2008 cited in U.S. Appl. No. 10/955,967.
U.S. Official Action dated Apr. 29, 2008 cited in U.S. Appl. No. 10/955,941.
U.S. Official Action dated May 28, 2008 cited in U.S. Appl. No. 10/982,073.
U.S. Official Action dated May 30, 2008 cited in U.S. Appl. No. 11/430,562.
U.S. Official Action dated Jun. 19, 2008 cited in U.S. Appl. No. 10/851,506.
U.S. Official Action dated Jun. 20, 2008 cited in U.S. Appl. No. 10/955,928.

(56) References Cited

OTHER PUBLICATIONS

U.S. Official Action dated Jun. 27, 2008 cited in U.S. Appl. No. 11/430,416.
U.S. Official Action dated Jul. 9, 2008 cited in U.S. Appl. No. 11/136,800.
U.S. Official Action dated Jul. 17, 2008 cited in U.S. Appl. No. 10/955,940.
U.S. Official Action dated Jul. 24, 2008 cited in U.S. Appl. No. 11/151,686.
U.S. Official Action mailed dated Oct. 8, 2008 cited in U.S. Appl. No. 11/445,393.
U.S. Official Action dated Oct. 28, 2008 cited in U.S. Appl. No. 11/151,686.
U.S. Official Action dated Nov. 13, 2008 in U.S. Appl. No. 11/430,562.
U.S. Official Action dated Nov. 25, 2008 U.S. Appl. No. 11/154,278.
U.S. Official Action mailed Dec. 11, 2008 in U.S. Appl. No. 10/982,073.
U.S. Official Action dated Dec. 23, 2008 in U.S. Appl. No. 10/955,942.
U.S. Official Action dated Dec. 24, 2008 in U.S. Appl. No. 10/955,967.
U.S. Official Action dated Jan. 6, 2009 in U.S. Appl. No. 10/955,941.
U.S. Official Action dated Jan. 9, 2009 in U.S. Appl. No. 11/430,561.
U.S. Official Action dated Mar. 18, 2009 in U.S. Appl. No. 11/401,470.
U.S. Official Action dated Apr. 7, 2009 in U.S. Appl. No. 10/955,940.
U.S. Official Action dated Apr. 28, 2009 in U.S. Appl. No. 12/028,797.
U.S. Official Action dated Jun. 1, 2009, U.S. Appl. No. 11/445,393.
U.S. Official Action dated Jun. 8, 2009 in U.S. Appl. No. 10/982,073.
U.S. Official Action dated Jun. 10, 2009 in U.S. Appl. No. 11/154,278.
U.S. Official Action dated Jun. 11, 2009 in U.S. Appl. No. 11/151,686.
U.S. Official Action dated Jun. 19, 2009 in U.S. Appl. No. 11/430,562.
U.S. Official Action dated Jun. 24, 2009 in U.S. Appl. No. 10/607,020.
U.S. Official Action dated Aug. 4, 2009 in U.S. Appl. No. 10/955,967.
U.S. Official Action dated Aug. 4, 2009 in U.S. Appl. No. 10/955,942.
U.S. Official Action dated Aug. 17, 2009 in U.S. Appl. No. 11/430,561.
U.S. Official Action dated Aug. 18, 2009 in U.S. Appl. No. 11/782,059.
U.S. Official Action dated Sep. 15, 2009 in U.S. Appl. No. 11/217,071.
U.S. Official Action dated Sep. 23, 2009 in U.S. Appl. No. 11/401,470.
U.S. Official Action dated Nov. 13, 2009 in U.S. Appl. No. 11/154,278.
U.S. Official Action dated Nov. 24, 2009 in U.S. Appl. No. 11/445,393.
U.S. Official Action dated Dec. 8, 2009 in U.S. Appl. No. 11/151,686.
U.S. Official Action dated Dec. 9, 2009 in U.S. Appl. No. 12/028,797.
U.S. Official Action dated Dec. 10, 2009 in U.S. Appl. No. 10/955,940.
U.S. Official Action dated Jan. 6, 2010 in U.S. Appl. No. 10/607,020.
U.S. Official Action dated Jan. 7, 2010 in U.S. Appl. No. 11/430,562.
U.S. Official Action dated Jan. 20 2010 in U.S. Appl. No. 10/955,967.
U.S. Official Action dated Jan. 25, 2010 in U.S. Appl. No. 10/982,073.
U.S. Official Action dated Feb. 18, 2010 in U.S. Appl. No. 11/782,059.
U.S. Official Action dated Feb. 19, 2010 in U.S. Appl. No. 10/955,942.
U.S. Official Action dated Feb. 22, 2010 in U.S. Appl. No. 11/401,470.
U.S. Official Action dated Mar. 30, 2010 in U.S. Appl. No. 11/217,071.
U.S. Official Action dated Apr. 15, 2010 in U.S. Appl. No. 11/823,999.
U.S. Official Action dated May 5, 2010 in U.S. Appl. No. 10/851,506.
U.S. Official Action dated May 25, 2010 in U.S. Appl. No. 10/607,020.
U.S. Official Action dated Jun. 3, 2010 in U.S. Appl. No. 12/028,797.
U.S. Official Action dated Jun. 22, 2010 in U.S. Appl. No. 11/430,562.
U.S. Official Action dated Jun. 23, 2010 in U.S. Appl. No. 10/955,940.
U.S. Official Action dated Jul. 1, 2010 in U.S. Appl. No. 11/782,059.
U.S. Official Action dated Jul. 6, 2010 in U.S. Appl. No. 10/955,967.
U.S. Official Action dated Aug. 2, 2010 in U.S. Appl. No. 10/955,942.
U.S. Official Action dated Aug. 6, 2010 in U.S. Appl. No. 11/401,470.
U.S. Official Action dated Sep. 21, 2010 in U.S. Appl. No. 11/217,071.
U.S. Official Action dated Sep. 27, 2010 in U.S. Appl. No. 10/836,154.
Mexican Office Action dated May 4, 2010 cited in Appln No. 2005/008354.
"Convert to Word 2007," http://www.regencytraining.com/word-2007-conversion.html, *Regency Training and Consulting*, 2 pages (Date Printed Apr. 21, 2008).
"Customer Story: SourceXtreme," SourceXtreme—Trolltech, http://trolltech.com/customers/casestories/stories/sourcextreme/?searchterm=sourcextreme, 2 pages (Date Printed Apr. 22, 2008).
"Inter-Widget Communication," http://web.mit.edu/6.115/www/miscfiles/amulet/amulet-help/IWC.htm, 6 pages (Feb. 13, 2007).
"The Technology in Document and Check Security," http://www.securedoc.In/thetechnology.htm, 7 pages (Date Printed Apr. 21, 2008).
Ando, R. et al., "Visualization-enabled multi-document summarization by Iterative Residual Rescaling," *Natural Language Engineering*, vol. 11, No. 1, pp. 67-86 (Mar. 2005) (2 page Abstract).
Bos, B, "Re: A proposal for addition to HTML 3.0: Frames," http://www.nyct.net/~aray/htmlwg/95q3/1141.html, 5 pages (Sep. 21, 1995).
de Candussio, N., "Common GUI Features Report," *Herschel CSDT Meeeting*, pp. 1-21 (Sep. 2007).
Krill, P., "Microsoft's Ribbon Interface Draws Frowns, Smiles," *InfoWorld*, http://www.infoworld.com/article/08/03/04/10NF-microsoft-fluentui_1.html, 3 pp. (Mar. 4, 2008).
Rice, F, "Customizing the 2007 Office System Document Inspector," http://msdn2.microsoft.com/en-us/library/aa338203(d=printer).aspx, 10 pages (May 2006).
U.S. Appl. No. 11/823,999, filed Jun. 29, 2007 entitled "Accessing an Out-Space User Interface for a Document Editor Program".
U.S. Appl. No. 12/163,758, filed Jun. 27, 2008 entitled "Communication Between a Document Editor-in-Space User Interface and a Document Editor Out-Space User Interface".
International Search Report dated Dec. 29, 2009 in connection with International Application No. PCT/US2009/046344.
Israeli Office Action dated Oct. 28, 2010 cited in Appln No. 169716.
Notice on Reexamination dated Jan. 21, 2011 cited in Appln No. 200510089514.X.
U.S. Official Action dated Nov. 22, 2010 in U.S. Appl. No. 11/782,059.
U.S. Official Action dated Nov. 26, 2010 in U.S. Appl. No. 12/753,923.
U.S. Official Action dated Dec. 8, 2010 in U.S. Appl. No. 10/851,506.
U.S. Official Action dated Dec. 8, 2010 in U.S. Appl. No. 10/955,967.
U.S. Official Action dated Dec. 16, 2010 in U.S. Appl. No. 11/430,562.
U.S. Official Action dated Dec. 20, 2010 in U.S. Appl. No. 11/445,393.
U.S. Official Action dated Dec. 20, 2010 in U.S. Appl. No. 12/574,256.
U.S. Official Action dated Dec. 29, 2010 in U.S. Appl. No. 12/028,787.
U.S. Official Action dated Jan. 5, 2011 in U.S. Appl. No. 11/823,999.
U.S. Appl. No. 12/954,952, filed Nov. 29, 2010 entitled "Gallery User Interface Controls".

(56) References Cited

OTHER PUBLICATIONS

U.S. Appl. No. 13/027,289, filed Feb. 15, 2011 entitled "Floating Command Object".
U.S. Official Action dated Feb. 11, 2011 in U.S. Appl. No. 11/401,470.
Bellavista et al., "A Mobile Infrastructure for Terminal, User, and Resource Mobility", Network Operations and Management Symposium, NOMS 2000, pp. 877-890, IEEE/IFIP.
"Microsoft Office Professional Plus 2007", © 2006, Microsoft Corporation; 66 pgs.
Adler, "Emerging Standards for Component Software," Cybersquare, 1995 IEEE, 10 pgs.
Chamberland, et al., "IBM VisualAge for Java," vol. 37, No. 3, 1998, 26 pgs., http://researchweb.watson.ibm.com/journal/sj/373/chamberland.html [Accessed Feb. 6, 2007].
Zykov, "ConceptModeller: A Problem-Oriented Visual SDK for Globally Distributed Enterprise Systems." Proceedings of the 7th International Workshop on Computer Science and Information Technologies, CSIT 2005, 4 pgs.
"Create Office add-ins: ribbons, toolbars, taskpanes, menus etc.", http://www.add-in-express.com/creating-addins-blog/feed/.
"RibbonX API: Extend the 2007 Office System with Your Own Ribbon Tabs and Controls", 2007, Microsoft Corporation, http://msdn.microsoft.com/msdnmag/issues/07/02RibbonX/de-fault.aspx.
"What's New in Excel 2007", Feb. 26, 2007.
Whitechapel et al., "Microsot Visual Studio 2005 Tools for the 2007 Microsoft Office", Sep. 2006, http://72.14.235.104/search?q=cache:kXdufDB6o-wJ:download.microsoft.com/download/3/2/d/32db7049-bc04-4c79a91b7f62eaae754a/VSTO2005SE_Tutorial.doc+This+tutorial+focuses+on+the+new+features+introduced+in+VSTO+2005_SE&hl=en&ct=clnk&cd=3&gl=in.
European Search Report dated Nov. 25, 2008 cited in Application EP 06 79 0087.
Israeli Office Action dated Jul. 5, 2010 cited in Appln No. 169718.
PCT Written Opinion and Search Report dated Sep. 2, 2010 cited in International Application No. PCT/US2010/021888.
Malaysian Substantive Examination Adverse Report dated Sep. 30, 2010 cited in Appln No. PI 20052959.
Australian Office Action dated Oct. 21, 2010 cited in Appln No. 2006284908.
Chinese Second Office Action dated Oct. 29, 2010 cited in Appln No. 200680030421.2.
U.S. Official Action dated Nov. 9, 2010 in U.S. Appl. No. 10/607,020.
U.S. Appl. No. 13/102,633, filed May 6, 2011 entitled "Markup Based Extensibility for User Interfaces".
Egypt Official Decision dated Mar. 14, 2011 cited in Appln No. 2005080371.
Malaysian Substantive Examination Adverse Report dated Mar. 15, 2011 cited in Appln No. PI 20053260.
2nd Notice on Reexamination dated Mar. 25, 2011 cited in Appln No. 200510089514.X.
Philippines Examiner's Action dated Apr. 12, 2011 cited in Appln No. 1-2005-00404.
Japanese Notice of Rejection dated May 6, 2011 cited in Appln. No. 2005-236089.
Japanese Notice of Rejection dated May 6, 2011 cited in Appln. No. 2005-236087.
Chinese Second Office Action dated May 19, 2011 cited in Appln No. 200780020312.7.
U.S. Official Action dated Apr. 21, 2011 in U.S. Appl. No. 11/445,393.
U.S. Official Action dated Apr. 21, 2011 in U.S. Appl. No. 12/574,256.
U.S. Official Action dated May 5, 2011 in U.S. Appl. No. 10/836,154.
U.S. Official Action dated May 12, 2011 in U.S. Appl. No. 12/753,923.
U.S. Official Action dated May 19, 2011 in U.S. Appl. No. 11/430,562.
U.S. Official Action dated May 19, 2011 in U.S. Appl. No. 10/851,506.
Seo et al, "Hangul Office 2000 Tutoring Book", Sep. 15, 2000, 16 pgs. (Korean Notice of Rejection May 17, 2011).
Redmond, Tony; Excerpt from Book; Microsoft Exchange Server 2003; Published 2003; 14 pgs. (provided to M&G Aug. 9, 2012 by Microsoft).
Chinese Office Action dated Jul. 12, 2012 in Appln No. 201080008789.5.
Chinese Decision on Rejection dated Jul. 31, 2012 cited in Appln No. 200680018095.3.
Chinese Office Action dated Aug. 2, 2012 in Appln No. 200980124945.1.
Homeworking Forum; archived Dec. 6, 2004; 11 pgs.
Japanese Office Action dated Jun. 10, 2011 cited in JP Application No. 2008-530229, w/translation.
Russian Office Action dated Jun. 14, 2011 cited in Appln No. 2008147090.
Chinese Third Office Action dated Jun. 21, 2011 cited in Appln No. 200680030421.2.
Chinese Second Office Action dated Jul. 14, 2011 cited in Appln No. 20680018095.3.
Chinese Decision on Rejection dated Jul. 21, 2011 cited in Appln No. 20068032789.2.
U.S. Official Action dated Jun. 7, 2011 in U.S. Appl. No. 11/332,822.
U.S. Official Action dated Jun. 9, 2011 in U.S. Appl. No. 12/464,584.
U.S. Official Action dated Jul. 8, 2011 in U.S. Appl. No. 11/401,470.
U.S. Official Action dated Aug. 3, 2011 in U.S. Appl. No. 12/142,927.
Dr. Dobb's Journal; "Windows 95 Common Controls"; May 1, 1995; 12 pgs.
Korean Notice of Rejection dated Nov. 3, 2011 cited in Appln No. 10-2005-0067257.
Japanese Notice of Rejection dated Nov. 4, 2011 cited in Appln No. 2008-513476.
Japanese Notice of Rejection dated Nov. 11, 2011 cited in Appln. No. 2008-530229.
Chinese Office Action dated Nov. 18, 2011 cited in Appln. No. 200910148820.4.
Chinese Office Action dated Nov. 29, 2011 cited in Appln. No. 200980124383.0.
Chinese Third Office Action dated Dec. 5, 2011 cited in Appln. No. 200680018095.3.
European Search Report dated Dec. 6, 2011 cited in Appln No. 06803424.8.
U.S. Official Action dated Oct. 25, 2011 in U.S. Appl. No. 12/144,642.
U.S. Official Action dated Nov. 2, 2011 cited in U.S. Appl. No. 10/836,154.
Mexican Office Action dated Oct. 3, 2011 cited in Appln. No. MX/a/2008/014849.
Aoyagi, Hideo, "Mail Mac Fan Special 33"; Manichi Communications Inc., Mar. 1, 2004, 5 pgs.
Morita, Utako; "Literature Searching System, 'JDream'"; Online Search; vol. 23, No. 4; The Society of Japan Terminal, Dec. 2002; 5 pgs.
Milstein, Sarah; "The Missing Manual: The book that should have been in the box", First Edition; O'Reilly Japan, Inc.; Nov. 25, 2004; 1 pg.
Cole; "New Arrival! Forefront of Downloading"; Mac People; vol. 11, No. 10; ASCII Corporation; Aug. 31, 2005; 1 pg.
Sada, Morihiro; "Clue for Managing Common Data Filed on Server"; Business Personal Computer Age; vol. 15, No. 7; Dempa Publications, Inc.; Jul. 1, 1997; 1 pg.
Japanese Notice of Rejection dated Nov. 25, 2011 cited in Appln. No. 2008-531249.
Korean Notice of Rejection dated Jan. 30, 2012 cited in Appln No. 10-2004-0048176.
Japanese Notice of Rejection dated Feb. 3, 2012 cited in Appln No. 2008-530218.
U.S. Official Action dated Jan. 26, 2012 in U.S. Appl. No. 12/464,584.
Ribbons; Microsoft; © 2012 Microsoft; http://msdn.microsoft.com/en-us/library/windows/desktop/cc872782.aspx; 45 pgs.
AutoCAD 2011—Customization Guide; Feb. 2010; Autodesk, Inc.; http://images.autodesk.com/adsk/files/acad_acg.pdf; 554 pgs.

(56) References Cited

OTHER PUBLICATIONS

Chinese Decision on Reexamination dated Feb. 1, 2012 cited in Appln No. 200510089514.X.
Taiwan Office Action dated Feb. 8, 2012 cited in Appln No. 94123640, with Eng Lang Summary.
Taiwan Search Report dated Mar. 14, 2012 cited in Appln No. 094123420.
Chilean Office Action dated Mar. 29, 2012 cited in Appln No. 1560-2010, w/English Language Summary.
Chilean Office Action dated Mar. 29, 2012 cited in Appln No. 1559-2010, w/English Language Summary.
India First Examination Report dated Mar. 30, 2012 cited in Appln No. 1817/DEL/2005.
Japanese Notice of Allowance dated Apr. 11, 2012 cited in Appln No. 2008-530229.
Chinese Fourth Office Action dated Apr. 27, 2012 cited in Appln No. 200680018095.3.
U.S. Official Action dated Apr. 19, 2012 in U.S. Appl. No. 13/102,633.
U.S. Official Action dated Apr. 26, 2012 in U.S. Appl. No. 11/782,059.
Ohmori, Yasuo et al., "Eigyo Mind—A Sales Support Tool," PFU Tech. Rev., vol. 10, No. 1, pp. 32-38, PFU Limited, May 1, 1999.
Korean Notice of Preliminary Rejection dated Jul. 22, 2011 cited in Appln No. 10-2005-0058160.
Japanese Notice of Rejection dated Aug. 12, 2011 cited in Appln. No. 2005-184990.
Korean Preliminary Rejection dated Aug. 23, 2011 cited in Appln. No. 10-2005-0067236.
Korean Preliminary Rejection dated Aug. 23, 2011 cited in Appln. No. 102005-0067411.
Korean Preliminary Rejection dated Aug. 29, 2011 cited in Appln. No. 10-2005-0066460.
Australian Office Action dated Aug. 31, 2011 cited in Appln. No. 2007255043.
3rd Official Notice, Mailing No. 134028, dated Sep. 16, 2001 cited in Appln. No. PH1707009.
4th Official Notice, Mailing No. 134052, dated Sep. 16, 2001 cited in Appln. No. PH1707009.
U.S. Official Action dated Sep. 13, 2011 in U.S. Appl. No. 12/372,386.
U.S. Official Action dated Sep. 14, 2011 in U.S. Appl. No. 12/163,758.
"The New "Office 2007" User Interface", Microsoft Corporation © 2005, 32 pgs.
"The New Look in Office 12 / Office 2007", Office Watch, posted Sep. 20, 2005, 9 pgs.
Atwood, "Sometime a Word is Worth a Thousand Icons", Coding Horror, Feb. 22, 2006, 9 pgs.
Seo et al, "Hangul Office 2000 Tutoring Book", Sep. 15, 2000, 16 pgs.
Office 2007, Microsoft, Released on Nov. 6, 2006, 23 pgs.
The Discussion Board Component of Blackboard: An Instructor's Guide; Aug. 2004; 23 pgs.
Hock, "Yahoo! to the Max"; May 10, 2005; 5 excerpted pgs.
Gina Danielle Venolia et al., Supporting Email Workflow, revised Dec. 2001; 11 pgs.
Mock et al., "An Experimental Framework for Email Categorization and Management", Sep. 9-12, 2001, 3 pgs.
Yang, "Email Categorization Using Fast Machine Learning Algorithms", 2002, 8 pgs.
Islam et al., "Email Categorization Using Multi Stage Classification Technique", 2007, 3 pgs.
"Look and Layout", retrieved at <<http://liv.ac.uk/csd/email/outlook/layout.htm>>, University of Liverpool, 9 pgs.
"Preview Pane in Conversation: 4 pane view", 2005, Zinbra Inc., 3 pgs.
"Reading Pane in Conversation View", retrieved at <<http://www.zimbra.com/forums/users/5918-reading-pane-conversation-view.html>>, 5 pgs.
New Zealand Office Action dated Oct. 14, 2009 cited in NZ Application No. 566363.
European Office Action dated Jun. 15, 2010 cited in EP Application No. 06814358.5.
Russian Office Action dated Jul. 26, 2010 cited in RU Application No. 2008109034, w/translation.
Chinese Office Action dated Nov. 11, 2010 cited in CN Application No. 200680032789.2, w/translation.
Russian Office Action dated Nov. 12, 2010 cited in Application No. 2008109034, w/translation.
PCT Written Opinion and Search Report dated Nov. 29, 2010 cited in International Application No. PCT/US2010/034277.
Mexican Office Action dated Jan. 6, 2011 cited in Appln No. PA/a/2005/008354.
Australian OA dated Jan. 17, 2011 cited in Application No. 2006287408.
Mexican Office Action dated Mar. 31, 2011 cited in Appln No. PA/a/2005/008351.
Mexican Office Action dated Mar. 31, 2011 cited in Appln No. PA/a/2005/008349.
Mexican Office Action dated Mar. 31, 2011 cited in Appln No. PA/a/2005/008350.
Chinese Second Office Action dated Apr. 7, 2011 cited in Application No. 200680032789.2, w/translation.
Korean Notice of Rejection dated May 17, 2011 cited in Appln No. 10-2004-48176.
Mexican Office Action dated May 26, 2011 cited in Appln. No. MX/a/2009/004151.
Mexican Office Action Summary, dated Sep. 22, 2011 cited in Appln. No. MX/a/2008/003342.
Japanese Notice of Rejection dated Dec. 16, 2011 cited in Appln No. 2008-529218.
U.S. Official Action dated Oct. 5, 2009 in U.S. Appl. No. 11/332,822.
U.S. Official Action dated Apr. 23, 2010 in U.S. Appl. No. 12/144,642.
U.S. Official Action dated Jun. 25, 2010 in U.S. Appl. No. 11/332,822.
U.S. Official Action dated Sep. 16, 2010 in U.S. Appl. No. 12/144,642.
U.S. Official Action dated Feb. 1, 2011 in U.S. Appl. No. 11/332,822.
U.S. Official Action dated Feb. 1, 2011 in U.S. Appl. No. 12/144,642.
U.S. Official Action dated Jan. 12, 2012 cited in U.S. Appl. No. 11/782,059.
Russel et al., (hereinafter "Russel"); "Special Edition Using Microsoft® Office Outlook ® 2003"; Que publishing on Sep. 25, 2003, 71 pgs. (Jun. 6, 2012 OA).
Israeli Office Action dated May 3, 2012 cited in Appln No. 169718.
Taiwan Office Action dated May 14, 2012 cited in Appln No. 94122180, with Eng Lang Summary.
Chinese Second Office Action dated Jun. 18, 2012 in Appln No. 200910148820.4.
Chinese Office Action dated Jul. 2, 2012 in Appln No. 200980124944.7.
U.S. Official Action dated Jun. 6, 2012 in U.S. Appl. No. 12/777,287.
U.S. Official Action dated Jun. 19, 2012 in U.S. Appl. No. 12/769,787.
U.S. Appl. No. 13/464,572, filed May 4, 2012 entitled "Accessing an Out-Space User Interface for a Document Editor Program".
Changing a Graph Type: Ultimate Illustration of Excel 2002 for Windows XP, General Book, X-media Corp., Aug. 31, 2002, p. 224.
Mexican Office Action dated Feb. 3, 2012 cited in Appln No. MX/a/2008/002889 with summary.
Israeli Office Action dated Feb. 23, 2012 cited in Appln No. 170668.
Japanese Notice of Rejection dated May 11, 2012 cited in Appln No. 2009-513223.
Mexican Office Action dated Jun. 6, 2012 cited in Appln No. MX/a/2008/014849.
U.S. Official Action dated May 8, 2012 in U.S. Appl. No. 12/144,642.
Malaysian Substantive Examination Adverse Report dated Jan. 31, 2012 Appln No. PI 20053258.
Malaysian Substantive Examination Adverse Report dated Jan. 31, 2012 Appln No. PI 20053259.

(56) References Cited

OTHER PUBLICATIONS

European Search Report dated Feb. 10, 2012 cited in Appln No. 05107153.8.
European Search Report dated Feb. 15, 2012 cited in Appln No. 05107157.9.
European Search Report dated Feb. 28, 2012 cited in Appln No. 05107184.3.
Chinese Office Action dated Feb. 29, 2012 cited in Appln No. 200980124664.9.
Chinese Decision on Rejection dated Mar. 7, 2012 cited in Appln No. 200780020312.7.
Chinese Second Office Action dated Mar. 9, 2012 cited in Appln No. 200980124383.0.
Japanese Notice of Final Rejection dated Mar. 9, 2012 cited in Appln No. 2008-513476.
European Search Report dated Mar. 16, 2012 cited in Appln No. 05107186.6.
Taiwan Notice of Allowance dated Mar. 29, 2012 cited in Appln No. 10120306600.
Douglas et al., "Dynamic Popup Menu Titles"; IP.Com Journal, IP.Com Inc., West Henrietta, NY, Aug. 1, 1992, 2 pgs.
Haden et al.; "Scrollable Popup Menu with Selection Tracking Display of Graphical Objects"; IP.Com Journal, IP.Com Inc., West Henrietta, NY, Aug. 1, 1994, 6 pgs.
"Index Card Metaphor for Multiple Property Sheets Associated with a Given Object"; IBM Technical Disclosure Bulletin, International Business Machines Corp., vol. 33, No. 3A, Aug. 1, 1990, 2 pgs.
"Menu Selection Method for Related Attributes"; IBM Technical Disclosure Bulletin, International Business Machines Corp., vol. 33, No. 6B, Nov. 1990, 3 pgs.
U.S. Official Action dated Feb. 27, 2012 in U.S. Appl. No. 12/372,386.
U.S. Official Action dated Mar. 14, 2012 in U.S. Appl. No. 12/142,927.
U.S. Official Action dated Apr. 5, 2012 in U.S. Appl. No. 12/163,758.
U.S. Appl. No. 13/437,031, filed Apr. 2, 2012 entitled "Automatic Grouping of Electronic Mail".
U.S. Appl. No. 13/427,939, filed Mar. 23, 2012 entitled "An Improved User Interface for Displaying a Gallery of Formatting Options Applicable to a Selected Object".
U.S. Appl. No. 13/615,668, filed Sep. 14, 2012 entitled "User Interface for Displaying Selectable Software Functionality Controls that are Relevant to a Selected Object".
Malaysian Examination Report dated Aug. 30, 2012 in Appln No. PI 20080400.
Chinese Second Office Action dated Sep. 12, 2012 in Appln No. 200980124944.7.
Mexican Office Action Summary dated Sep. 18, 2012 in Appln No. MX/a/2008/003342.
Chilean Office Action dated Sep. 21, 2012 cited in Appln No. 1560-2010, w/English Language Summary.
EP Communication dated Sep. 26, 2012 cited in Appln No. PCT/US2006/034993.
U.S. Official Action dated Sep. 13, 2012 in U.S. Appl. No. 13/437,031.
Microsoft Office 2007 Word Help, 3 pgs.
Alexander, Keeping New Messages Marked 'Unread' (2007), http://certcities.com/editorial/colums/story.asp?EditorialsD=243, 2 pgs.
Wiley, Microsoft® Office Outlook® 2007 for Dummies®, 9 pgs.
Canadian Office Action dated Nov. 29, 2012 cited in Appln No. 2,512,036.
Russian Office Action dated Dec. 12, 2012 cited in Appln No. 2010140069.
Chinese Second Office Action dated Dec. 17, 2012 cited in Appln No. 200980124644.9.
Chinese Third Office Action dated Dec. 31, 2012 in Appln No. 200980124944.7
Chinese Second Office Action dated Dec. 31, 2012 in Appln No. 200980124945.1.
Chinese Second Office Action dated Jan. 4, 2013 in Appln No. 201080008789.5.
Chinese Office Action dated Jan. 6, 2013 in Appln No. 201080021957.4.
EP Communication dated Jan. 10, 2013 cited in Appln No. PCT/US2010/021888, 8 pgs.
Malaysian Substantive Examination Adverse Report dated Jan. 15, 2013 in Appln No. PI 20084401, 3 pgs.
Canadian Office Action dated Jan. 18, 2013 in Appln No. 2,512,155, 6 pgs.
Mexican Office Action dated Feb. 5, 2013 cited in Appln No. MX/a/2008/014849, 8 pgs.
Chinese Office Action dated Feb. 5, 2013 cited in Appln No. 200910148820.4, 5 pgs.
U.S. Official Action dated Dec. 12, 2012 in U.S. Appl. No. 10/851,506.
U.S. Official Action dated Dec. 12, 2012 in U.S. Appl. No. 12/954,952.
U.S. Official Action dated Dec. 31, 2012 in U.S. Appl. No. 12/142,927.
U.S. Appl. No. 13/769,598, filed Feb. 18, 2013 entitled "Automatic Conversation Techniques".
EP Search Report dated Jan. 30, 2013 in Appln No. PCT/US2009/044059, 8 pgs.
Mexican Office Action dated Feb. 25, 2013 in Appln No. MX/a/2008/002889, 11 pgs.
Korean Notice of Rejection dated Feb. 25, 2013 in Appln No. 10-2008-7005366, 5 pgs.
U.S. Official Action dated Mar. 1, 2013 in U.S. Appl. No. 11/430,562, 66 pgs.
U.S. Appl. No. 13/595,084, filed Aug. 27, 2012 entitled "Command User Interface for Displaying Selectable Software Functionality Controls".
Mexican Office Action Summary dated Jun. 25, 2012 in Appln No. PA/a/2005/008354.
Korean Notice of Preliminary Rejection dated Jul. 2, 2012 cited in Appln No. 10-012-0024393.
Korean Notice of Preliminary Rejection dated Jul. 19, 2012 cited in Appln No. 10-2007-7024571.
Chinese Third Office Action dated Aug. 14, 2012 in Appln No. 200980124383.0.
U.S. Official Action dated Aug. 7, 2012 in U.S. Appl. No. 10/836,154.
Mexican Office Action dated Jul. 9, 2013 in Appln No. MX/a/2008/002889.
Israeli Office Action dated Oct. 17, 2013 cited in Appln No. 1611334.
India First Examination Report dated Oct. 21, 2013 cited in Appln No. 1017/DEL/2004.
Canadian Office Action dated Oct. 30, 2013 in Appln No. 2,512,047.
Korean Notice of Preliminary Rejection dated Nov. 7, 2013 cited in KR-10-2008-7029272.
Canadian Office Action dated Nov. 15, 2013 in Appln No. 2,512,102.
U.S. Official Action dated Nov. 8, 2013 in U.S. Appl. No. 13/615,668, 114 pgs.
U.S. Official Action dated Nov. 15, 2013 in U.S. Appl. No. 11/782,059, 33 pgs.
U.S. Official Action dated Nov. 29, 2013 in U.S. Appl. No. 12/144,642, 73 pgs.
Miser, "Special Edition Using Mac OS X v10.2"; Pub. Date Jan. 3, 2003; QUE; Spe. Ed.; pp. 272-275.
Mod et al., "Design and Development of Multidevice User Interfaces through Multiple Logical Descriptions"; Aug. 2004; vol. 30; 14 pgs.
Israeli Office Action dated Jun. 3, 2012 cited in Appln No. 189293.
Israeli Office Action dated Aug. 29, 2012 in Appln No. 169717.
Malaysian Substantive Examination Report dated Oct. 31, 2012 cited in Appln No. PI 20053260, 2 pgs.
Canadian Office Action dated Nov. 29, 2012 cited in Appln No. 2,511,101 3 pgs.
Mexican Office Action dated Jan. 22, 2013 cited in Appln No. MX/a/2008/003342.
Japanese Notice of Preliminary Rejection dated Mar. 12, 2013 in Appln No. 2011-516371, 4 pgs.
Korean Notice of Preliminary Rejection dated Mar. 19, 2013 in Appln No. 10-2008-7005659, 4 pgs.

(56) References Cited

OTHER PUBLICATIONS

Japanese Notice of Preliminary Rejection dated Mar. 19, 2013 in Appln No. 2011-514652, 6 pgs.
Mexican Office Action dated Mar. 22, 2013 in Appln No. PA/a/2005/008350.
EP Search Report dated Apr. 18, 2013 in Appln No. PCT1US20061012724, 12 pgs.
Chinese Fourth Office Action dated Apr. 23, 2013 cited in Appln No. 200980124944.7, 7 pgs.
Philippines Substantive Examination Report dated Apr. 25, 2013 cited in Appln No. 1-2005-000495.
EP Search Report dated May 10, 2013 cited in Appln No. PCT/US2009/044292.
Russian Office Action dated May 13, 2013 cited in Appln No. 2010-151922.
Korean Final Notice of Preliminary Rejection dated May 20, 2013 cited in Appln No. 10-2008-7005939.
Mexican Office Action dated May 23, 2013 in Appln No. MX/a/2008/003342.
Chinese Notice on Third Office Action dated Jun. 5, 2013 Appln No. 200980124644.9.
Mexican Office Action dated Jun. 11, 2013 in Appln No. PA/a/2005/008351.
Israeli Office Action dated Jun. 18, 2013 cited in Appln No. 170668.
Mexican Office Action dated Jun. 20, 2013 in Appln No. MX/a/2010-014056.
EP Communication dated Jul. 17, 2013 in Appln No. EP 07 795 391.7.
Chinese Second Office Action dated Aug. 5, 2013 in Appln No. 201080021957.4.
Russian Decision on Grant dated Aug. 12, 2013 in Appln No. 2010151922/08.
U.S. Official Action dated Mar. 14, 2013 in U.S. Appl. No. 12/574,256, 73 pgs.
U.S. Official Action dated Apr. 4, 2013 in U.S. Appl. No. 11/782,059, 39 pgs.
U.S. Official Action dated Apr. 18, 2013 in U.S. Appl. No. 10/851,506, 34 pgs.
U.S. Official Action dated Apr. 29, 2013 in U.S. Appl. No. 12/954,952, 18 pgs.
U.S. Official Action dated May 21, 2013 in U.S. Appl. No. 13/437,031, 13 pgs.
U.S. Official Action dated May 23, 2013 in U.S. Appl. No. 11/401,470, 101 pgs.
U.S. Official Action dated Jun. 3, 2013 in U.S. Appl. No. 13/102,622, 29 pgs.
U.S. Official Action dated Jul. 18, 2013 in U.S. Appl. No. 10/607,020, 109 pgs.
U.S. Official Action dated Jul. 23, 2013 in U.S. Appl. No. 11/782,059, 35 pgs.
U.S. Official Action dated Jul. 24, 2013 in U.S. Appl. No. 12/142,927, 42 pgs.
U.S. Official Action dated Aug. 2, 2013 in U.S. Appl. No. 12/777,287, 47 pgs.
U.S. Official Action dated Aug. 14, 2013 in U.S. Appl. No. 11/332,822, 102 pgs.
U.S. Official Action dated Aug. 19, 2013 in U.S. Appl. No. 10/851,506, 24 pgs.
U.S. Official Action dated Aug. 30, 2013 in U.S. Appl. No. 12/574,256, 31 pgs.
U.S. Official Action dated Sep. 6, 2013 in U.S. Appl. No. 12/028,797, 113 pgs.
U.S. Appl. No. 13/925,523, filed Jun. 24, 2013 entitled "Communication Between a Document Editor-in-Space User Interface and a Document Editor Out-Space User Interface", Dukhon et al.
U.S. Appl. No. 14/032,094, filed Sep. 19, 2013 entitled "User Interface for Displaying Selectable Software Functionality Controls that are Relevant to a Selected Object", Satterfield et al.
Mexican Office Action dated Jun. 11, 2013 cited in Appln. No. MX/a/2008/003342.
Canadian Office Action dated Sep. 18, 2013 in Appln No. 2,512,036.
Japanese Notice of Rejection dated Sep. 19, 2013 in Appln No. 2012-153634.
Mexican Office Action dated Sep. 27, 2013 in Appln No. MX/a/2008/014849.
EP Communications to Attend Oral Proceedings dated Oct. 4, 2013 in Appln No. 09 006 972.5.
Canadian OA dated Oct. 7, 2013 in Appln No. 2,650,016.
Chilean Third Office Action dated Oct. 9, 2013 in Appln No. 2512-2005.
Mexican Office Action dated Oct. 28, 2013 cited in Appln. No. MX/a/2010/013566.
U.S. Appl. No. 14/142,132, filed Dec. 27, 2013 entitled "Expanded Search and Find User Interface".
Chinese Third Office Action dated Dec. 4, 2013 in Appln No. 200680032789.2.
Canadian Office Action dated Dec. 5, 2013 in Appln No. 2,618,169.
U.S. Official Action dated Dec. 6, 2013 in U.S. Appl. No. 10/851,506, 25 pgs.
U.S. Appl. No. 14/150,531, filed Jan. 8, 2014 entitled "Modifying and Formatting a Chart Using Pictorially Provided Chart Elements".
Inoue; "Let's Learn PowerPoint Using Actual Samples"; Nikkei PC21, Japan, Nikkei Business Publications, Inc., Apr. 1, 2008, vol. 13, No. 7.
Chinese Decision on Rejection dated Jan. 13, 2014 in Appln No. 200980124644.9.
EP Communication dated Feb. 11, 2014 in Appln No. 09 798 374.6.
Mexican Office Action dated Feb. 11, 2014 cited Appln No. MX/a/2008/003342, 8 pgs.
EP Communication on Decision to Refuse dated Feb. 20, 2014 in Appln No. 09 006 972.5.
U.S. Official Action dated Jan. 16, 2014 in U.S. Appl. No. 13/102,633, 45 pgs.
U.S. Official Action dated Jan. 29, 2014 in U.S. Appl. No. 12/777,287, 44 pgs.
Malaysian Substantive Examination Report dated Jan. 15, 2014 in Appln No. PI 20080508, 3 pgs.
Canadian Office Action dated Jan. 28, 2014 in Appln No. 2,511,101, 4 pgs.
Australian Office Action dated Feb. 28, 2014 in Appln No. 2009262834, 3 pgs.
Australian Office Action dated Feb. 28, 2014 in Appln No. 2009262833, 3 pgs.
Australian Office Action dated Mar. 4, 2014 in Appln No. 2009260596, 4 pgs.
Australian Office Action dated Mar. 4, 2014 in Appln No. 2009271517, 3 pgs.
U.S. Official Action dated Feb. 4, 2014 in U.S. Appl. No. 10/607,020, 149 pgs.
U.S. Official Action dated Feb. 26, 2014 in U.S. Appl. No. 12/954,952, 38 pgs.
U.S. Official Action dated Mar. 3, 2014 in U.S. Appl. No. 11/332,822, 38 pgs.
U.S. Official Action dated Mar. 4, 2014 in U.S. Appl. No. 12/142,927, 45 pgs.

\* cited by examiner

EXPOSING NON-AUTHORING FEATURES THROUGH DOCUMENT STATUS INFORMATION IN AN OUT-SPACE USER INTERFACE

RELATED APPLICATIONS

This patent application is a continuation-in-part of U.S. patent application Ser. No. 11/823,999, "now U.S. Pat. No. 8,201,103", filed Jun. 29, 2007 and entitled "Accessing An Out-Space User Interface For a Document Editor Program," which is incorporated herein in its entirety as if fully set out herein. This patent application is related to U.S. patent application Ser. No. 12/163,758, "now U.S. Pat. No. 8,484,578", filed Jun. 27, 2008, entitled "Communication Between A Document Editor In-Space User Interface And A Document Editor Out-Space User Interface," which is incorporated herein by reference as if fully set out herein.

BACKGROUND

In many document editors, authoring features, such as text and data entry features, formatting features, and the like, are available via one or more readily available feature menus. However, non-authoring features, such as document security management, file format conversion, and document editing permissions management, are often difficult to locate. In addition, when a user determines a non-authoring status of a given document, for example, whether the document is in "read-only" mode, an application feature for changing the non-authoring status may be difficult to locate and use. In addition, when a given type of status for a document changes, for example, when the document is being edited by another user, a present user may not know that the status of the document has changed.

It is with respect to these and other considerations that the present invention has been made.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter.

Embodiments of the present invention solve the above and other problems by providing access to document information and status and related features/functionalities via an out-space user interface for a document editor program. An out-space actuator is associated with an in-space user interface having a displayed document. When the out-space actuator is selected, an out-space user interface is displayed that includes a display surface for displaying document information and status and for exposing non-authoring features and functionalities.

According to one embodiment, the out-space user interface may be used to display one or more status panes for providing status information about a document being edited in the in-space user interface. According to another embodiment, application features for affecting changes to a given document's status may be exposed in the out-space interface in proximity to associated status information.

According to another embodiment, an out-space communication user interface (UI) component may be temporarily displayed in the document in-space user interface to communicate document status information that is presently available in the out-space user interface. The out-space actuator may be displayed in the out-space communication UI component to allow a user to selectively display the out-space UI to receive additional information and/or features or functionality associated with the document status information. According to one embodiment, a document status pane displayed in the out-space user interface associated with the information displayed in the out-space communication UI component may be visually highlighted to call a user's attention to a document status pane associated with the information displayed in the out-space communication user interface component.

According to another embodiment, a message bar may be displayed in the in-space user interface for communicating information from the out-space user interface. An out-space actuator may be displayed in the message bar for visually associating the message bar with the out-space user interface and for allowing a user to selectively launch the out-space user interface for obtaining additional information and/or functionality or features associated with the document status information communicated from the out-space user interface via the message bar displayed in the in-space user interface.

These and other features and advantages which characterize the present invention will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
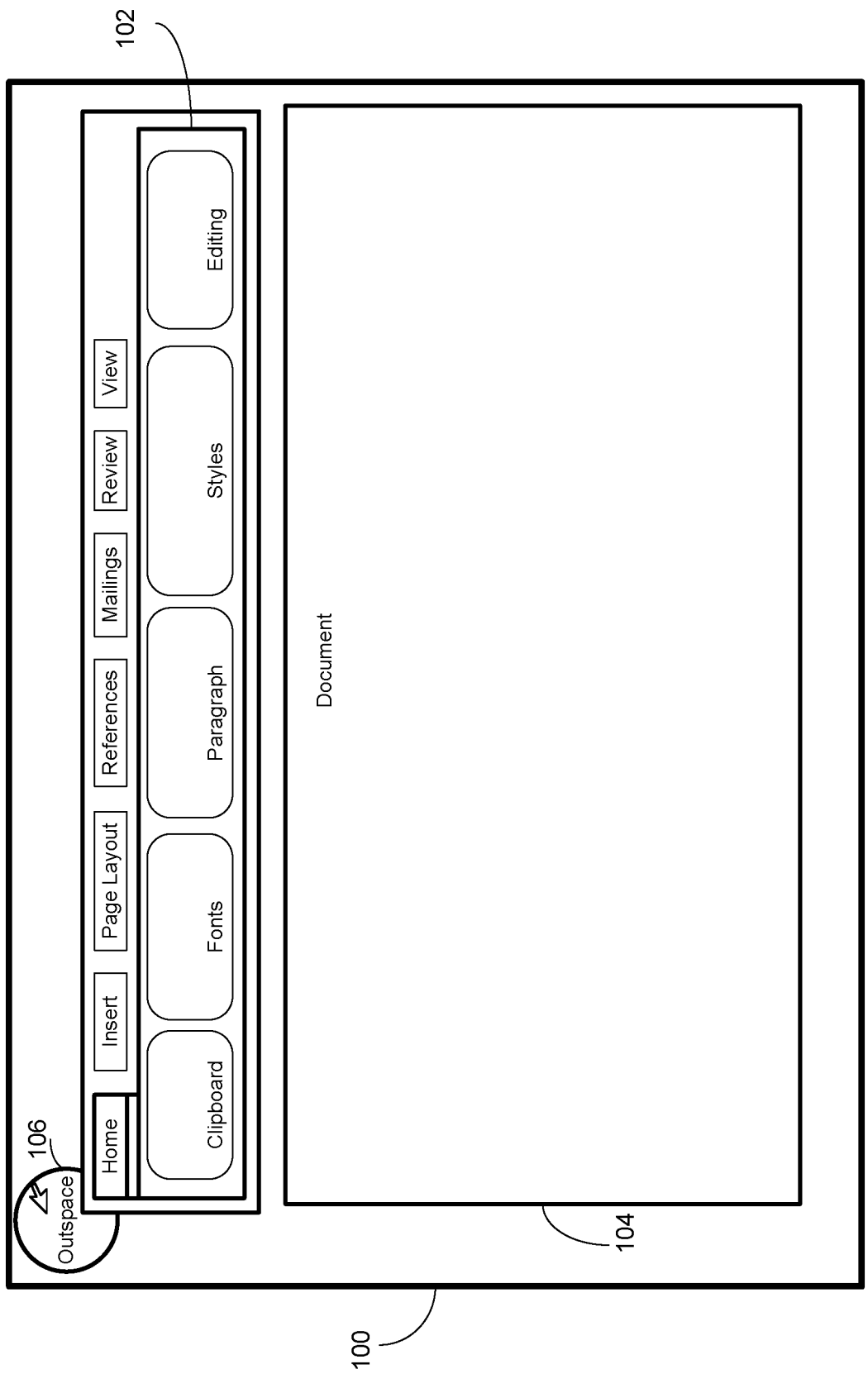
FIG. 1 represents one example of an in-space user interface having an out-space actuator.

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments described herein are referred to alternatively as operations, steps or modules.

Embodiments of the invention are directed to accessing an out-space user interface from an in-space user interface of a document editor. According to one embodiment, the out-space user interface is an interface that includes a category of features that do not require a document to be present on the display surface. According to another embodiment, an out-space user interface is a user-interface that includes non-authoring system features for a document editor program. The out-space user interface provides features to allow a user to do something with the document. In one aspect, the features do not affect the content of the document. As an example, out-space features may include document information features, document log features, print features, getting started features, and application information features. As other examples, out-space features may include a new feature, an open feature, a save feature, a close feature, a document inspector feature, a send for review feature, a mark as final feature, a permissions feature, a template feature, a PDF feature, document properties, a package for CD feature, an encryption feature, an online feature, an assign document tasks feature, an options feature, a publish to server feature, related document links, a digital signature, a blog feature, a compatibility checker, a fax feature, a document workspace, versioning, check in/out services, and workflow services. Other examples of out-space features may include tagging, workspaces/projects, related document and information features, access to sharing features, branding, people and groups, community connections and file searches. The aforementioned are but a few examples of out-space features. Out-space features may include any non-authoring features that do not require the user to see the document while working with the features. In one aspect, the out-space user interface only includes non-authoring features that do not affect the content of the document. In another aspect, the out-space user interface does not include authoring features.

According to one embodiment, the out-space user interface may be used to display one or more document status panes or slabs which are user interface components for displaying document status information, for example, document security management status, document file format status information, information about one or more other users having access to a given document, whether a document contains digital signatures, whether previous versions of the document are available, whether the document is set to a particular edit mode, for example, "read-only," and the like.

According to another embodiment, application features and/or functionalities for affecting changes to document status may be exposed in proximity to displayed document status in the form of a selectable button or control for allowing a user to selectively affect changes to displayed document status via an associated application feature. Alternatively, information about how a given application feature or functionality may be applied to an associated document status may be displayed with the document status.

According to another embodiment, an out-space communication user interface (UI) component may be temporarily displayed in the document in-space user interface to communicate document status information that is presently available in the out-space user interface. The out-space actuator may be displayed in the out-space communication UI component to allow a user to selectively display the out-space UI to receive additional information and/or features or functionality associated with the document status information. According to one embodiment, a document status pane displayed in the out-space user interface associated with the information displayed in the out-space communication UI component may be visually highlighted to call a user's attention to a document status pane associated with the information displayed in the out-space communication user interface component.

According to still another embodiment, a message bar may be displayed in the in-space user interface for communicating information from the out-space user interface. An out-space actuator may be displayed in the message bar for visually associating the message bar with the out-space user interface and for allowing a user to selectively launch the out-space user interface for obtaining additional information and/or functionality or features associated with the document status information communicated from the out-space user interface via the message bar displayed in the in-space user interface.

In contrast to the out-space user interface, an in-space user interface is a user interface that includes authoring features for authoring or changing the content of a document. The affects of an in-space feature show up on the document that is being authored. An in-space user interface may include home features, insert features, page layout features, reference features, mailing features, review features and view features. An in-space user interface may also include formatting features and writing tools. Other examples of in-space user interface features may include text features, picture features, tables, shapes, chat features, bold features, font features, layout features, arranging features, style features, find tools, spelling tools, a paste tool, a word count, and a synonym finder. These examples are but a few examples of in-space features. In-space features may include any authoring feature for authoring or changing the content of a document.

As set forth herein, a user may open a document editor to author a document. A document editor may include a word processing editor, a spreadsheet editor, a slide presentation editor, a web page editor, an email editor and/or any other type of editor for editing a document. Although a document editor is described herein, an out-space user interface may also be associated with non-editing programs such as a browser, a web page, an email application, a project application, etc. When a document editor is opened, the user may author a document using the in-space user interface. When the user decides to perform a non-authoring feature the user may select an out-space actuator. Upon selection, the document is removed from the display and the ribbon is expanded to provide display space for the rich out-space features. In another aspect, the ribbon is replaced with an expanded feature selection surface. In still another aspect, the document is converted to an image, thumbnail, or miniature bitmap and moved to the out-space user interface. In yet another aspect, the entire in-space user interface is converted to an image, thumbnail, or miniature bitmap and moved to the out-space user interface. In this manner, the user has reassurance that they are not leaving the document editor program. If the user desires returning to the in-space user interface, the document image may be selected. Upon selection, the in-space user interface is repopulated on the display.

By providing navigation between in-space and out-space, users may easily become familiar with out-space features because they are separated from authoring features. By separating in-space and out-space features, users may easily find features because the features are categorized. Features may be richer and provide more information and functionality because the "real estate" of the display is better utilized. A greater amount of "real estate" is available for out-space features, thereby allowing software developers the opportunity to increase the functionality of a document editor program. Channels of communication associated with a document are better managed because they are not mixed in with in-space features.

FIG. 1 represents one example of a primary or in-space user interface having an out-space actuator. Document editor 100 includes ribbon 102, document 104 and out-space actuator 106. Document editor 100 may include a word processing editor, a spreadsheet editor, a slide presentation editor, a web document editor, an email editor and/or any other type of editor for editing a document. Document editor may be associated with a computing device, such as the exemplary computing device set forth in FIG. 9.

Ribbon 102 includes a plurality of ribbon tabs such as home tab, insert tab, page layout tab, references tab, mailings tab, review tab, view tab, and/or any other type of authoring tab. Ribbon 102 may also include features associated with the tab. For example, ribbon 102 depicts a home tab having clipboard features, font features, paragraph features, style features, and editing features. The tabs and features depicted in FIG. 1 are but examples of tabs and features. Ribbon 102 may include any type of authoring tabs and features depending on the type of document 104 being authored.

Document 104 may be located below ribbon 102. Document 104 may be a "live" document that allows a user to edit and author the content of document 104. Document 104 may include a word processing document, a slide presentation document, a spreadsheet document, an internet document, an email document, and/or any other type of document that may be authored.

Out-space actuator 106 may include any type of button or selector. Even though out-space actuator 106 is depicted in the upper left corner of document editor 104, out-space actuator may be located anywhere in document editor 104. In one aspect, out-space actuator 106 provides "one-click" actuation of an out-space user interface. In this manner, a user is not required to navigate drop-down menus or lists to find out-space features.

Figure 2:
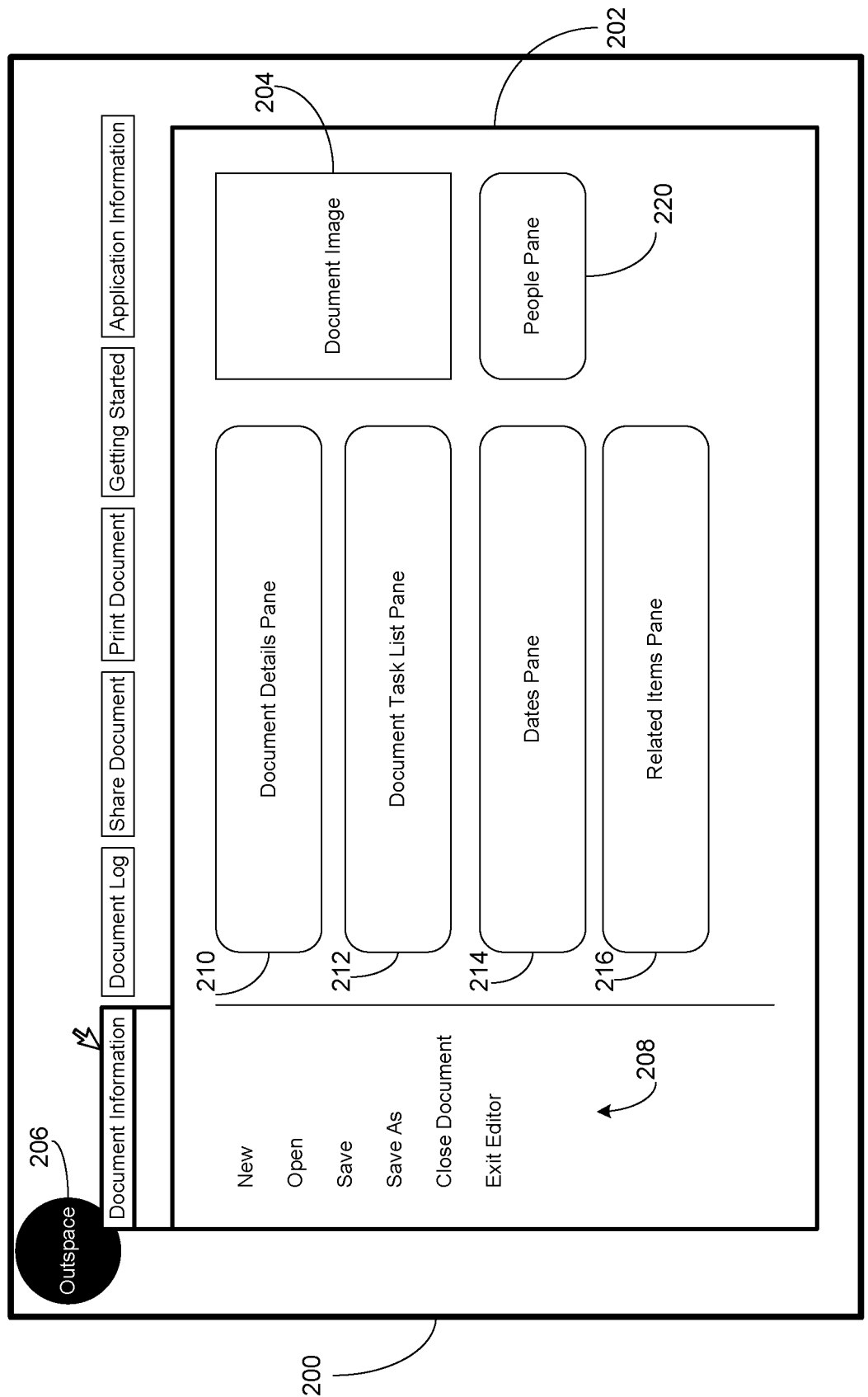
FIG. 2 represents one example of an out-space user interface having a document information tab.

FIG. 2 represents one example of a secondary or out-space computer-generated user interface having a document information tab. Even though FIGS. 2-7 depicts tabs along the top of document editor 200, the tabs may be located on the sides, bottom and/or any other location within document editor. The tabs may also include buttons, quick links and/or other features not specifically depicted in FIG. 2-7. Document editor 200 includes expanded ribbon 202, document image 204 and out-space actuator 206. Expanded ribbon 202 includes a plurality of ribbon tabs such as a document information tab, a document log tab, a share document tab, a print document tab, a getting started tab, and an application information tab. As shown in FIG. 2, expanded ribbon 202 includes a greater display area than ribbon 102 of FIG. 1. In one aspect, expanded ribbon 202 populates the display area that was utilized by document 104 before document 104 was removed from the display area. In another aspect, expanded ribbon 202 includes buttons and functionality that allows the user to work in expanded ribbon 202.

Document image 204 may include an image, a thumbnail, and a miniature bitmap of document 104. In another aspect, the entire in-space user interface is converted to an image, thumbnail, or miniature bitmap and moved to the out-space user interface. Document image 204 may be static or "non-live." Stated another way, a user may not be able to author document image 204 while in the out-space user interface. In one aspect, document 104 is converted to document image 204 when out-space actuator 106 is selected. In another aspect, document image 204 is displayed in expanded ribbon 202. In still another aspect, document image may provide a link back to the in-space user interface depicted in FIG. 1. Stated another way, a user may navigate back to the in-space user interface of FIG. 1 by selecting document image 204. Document image 204 may provide "one-click" actuation of an in-space user interface. In this manner, a user is not required to navigate drop-down menus or lists to find in-space features. In other aspects, out-space actuator 206 or any other type of button or selector may be selected to navigate back to the in-space user interface.

As depicted in FIG. 2, document editor 200 may include document information tab. Document information tab may be associated with document image 204, quick features 208, document details pane 210, document task list pane 212, dates pane 214, related items pane 216, and people pane 218. Quick features 208 may include a new feature, an open feature, a save feature, a save-as feature, a close document feature, and an exit editor feature. Document details pane 210 may include fields for entering metadata related to document 104. Such fields may include a title field, subject field, abstract field, author field, page number field, and a word count field. Document task list pane 212 may include a list of reminder tasks and fields for completing a project. Dates pane may include a set of fields for populating dates associate with benchmarks for a project. Related items pane 216 may include a list of items and fields for populating related items in document 104. For example, a related item may include a link to a webpage. People pane 218 may include a set of fields for providing access levels to people associated with document 104. For example, an access level may include no access, full access or partial access.

Figure 3:
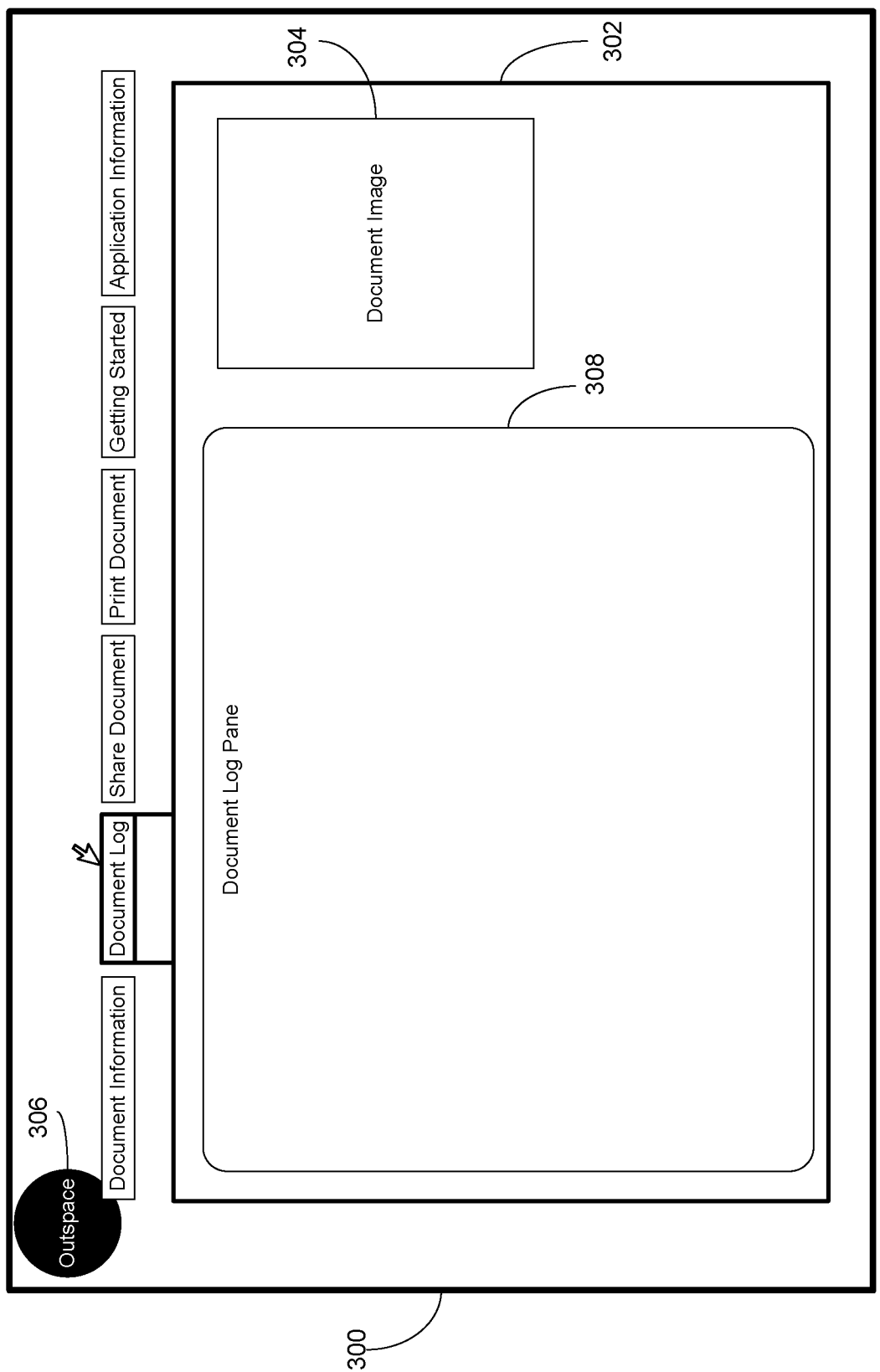
FIG. 3 represents one example of an out-space user interface having a document log tab.

FIG. 3 represents one example of an out-space user interface having a document log tab. Document editor 300 includes expanded ribbon 302, document image 304 and out-space actuator 306. As depicted in FIG. 3, document editor 300 may include document log tab. Document log tab may be associated with document image 304 and document log pane 308. Document log pane 308 may include a list and fields associated with events related to a document. For example, documents log pane 308 may include a list of print dates, saving dates, sharing dates and/or any other document events that may be relevant in a log.

Figure 4:
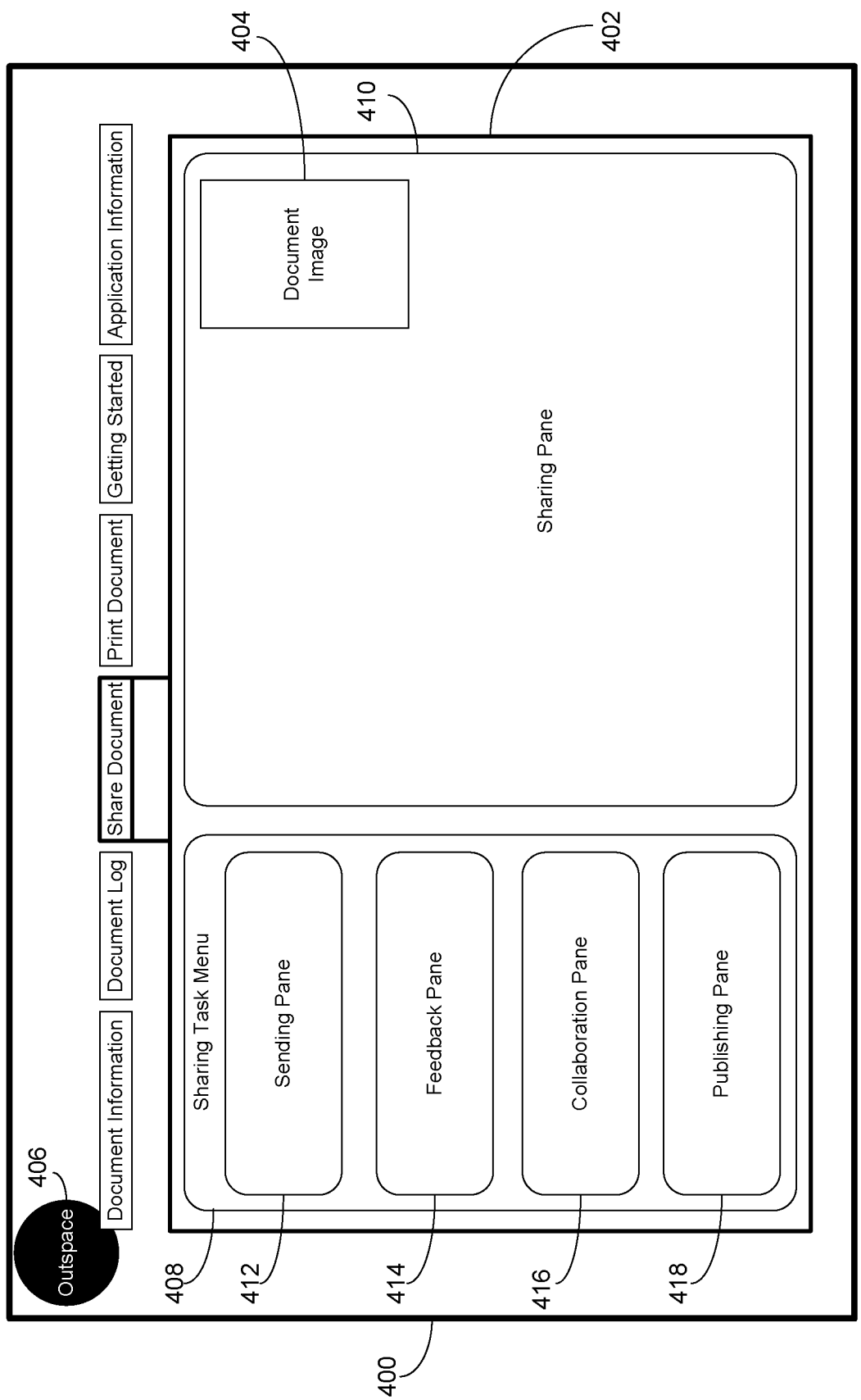
FIG. 4 represents one example of an out-space user interface having a share document tab.

FIG. 4 represents one example of an out-space user interface having a share document tab. Document editor 400 includes expanded ribbon 402, document image 404 and out-space actuator 406. As depicted in FIG. 4, document editor 400 may include share document tab. Share document tab may be associated with document image 404, sharing task menu 408 and sharing pane 410. Share task menu 408 may include several features for sharing the document with other users. Sharing pane 410 may include a set of fields and functions for sharing the document. Sharing task menu may include sending pane 412, feedback pane 414, collaboration pane 416, and publishing pane 418. Sending pane 412 may include a send as attachment feature, a use document as message body feature, and/or a send document as fax feature. Feedback pane 414 may include a collect feedback feature, which routes the document to several people. Feedback pane 414 may also include a seek approval feature, which routes the document to several people and asks them to accept or reject the document. Feedback pane 414 may also include a send and track changes features, which emails a copy of the document and asks others to propose changes to include in the document. Collaboration pane 416 may include a workspace collaboration feature, which assigns owners to sections of the document. Collaboration pane 416 may also include a server collaboration feature, which invites others to access a shared copy of the document. Publishing pane 418 may include a publish to blog feature and a publish to management server feature.

Figure 5:
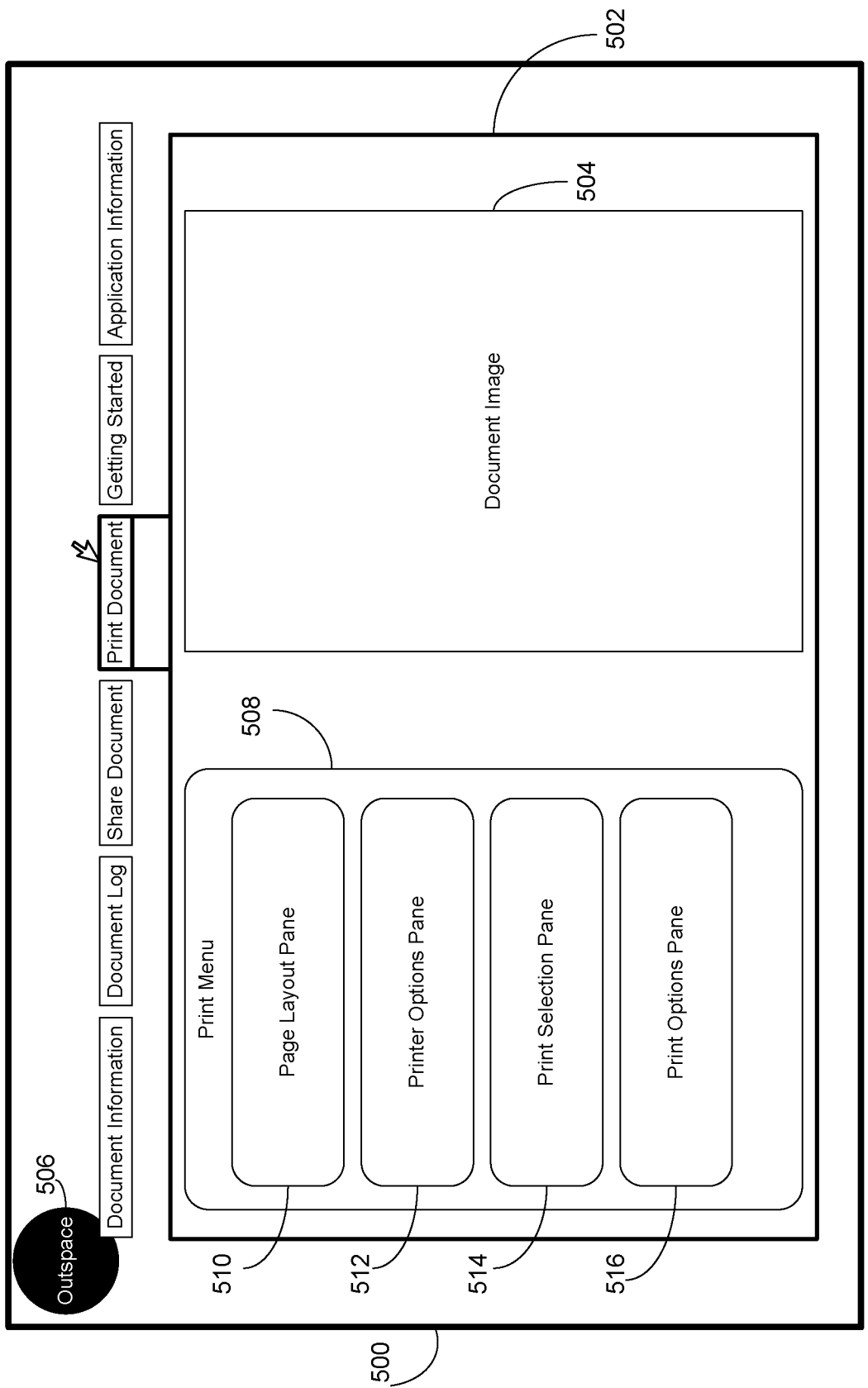
FIG. 5 represents one example of an out-space user interface having a print document tab.

FIG. 5 represents one example of an out-space user interface having a print document tab. Document editor 500 includes expanded ribbon 502, document image 504 and out-space actuator 506. As depicted in FIG. 5, document editor 500 may include print document tab. Print document tab may be associated with document image 504 and print menu pane 508. Print menu 508 may include page layout pane 510, printer options pane 512, print selection pane 514, and print options pane 516. Page layout pane 510 may include a margins feature, an orientation feature, a size feature, a shrink page feature, and a view feature. Printer options pane 512 may include a field for selecting a printer and data associated with the status, type and location of the printer. Print selection pane 514 may include fields for selecting a portion of the document to print. Print options pane 516 may include fields for selecting how the document should be printed.

Figure 6:
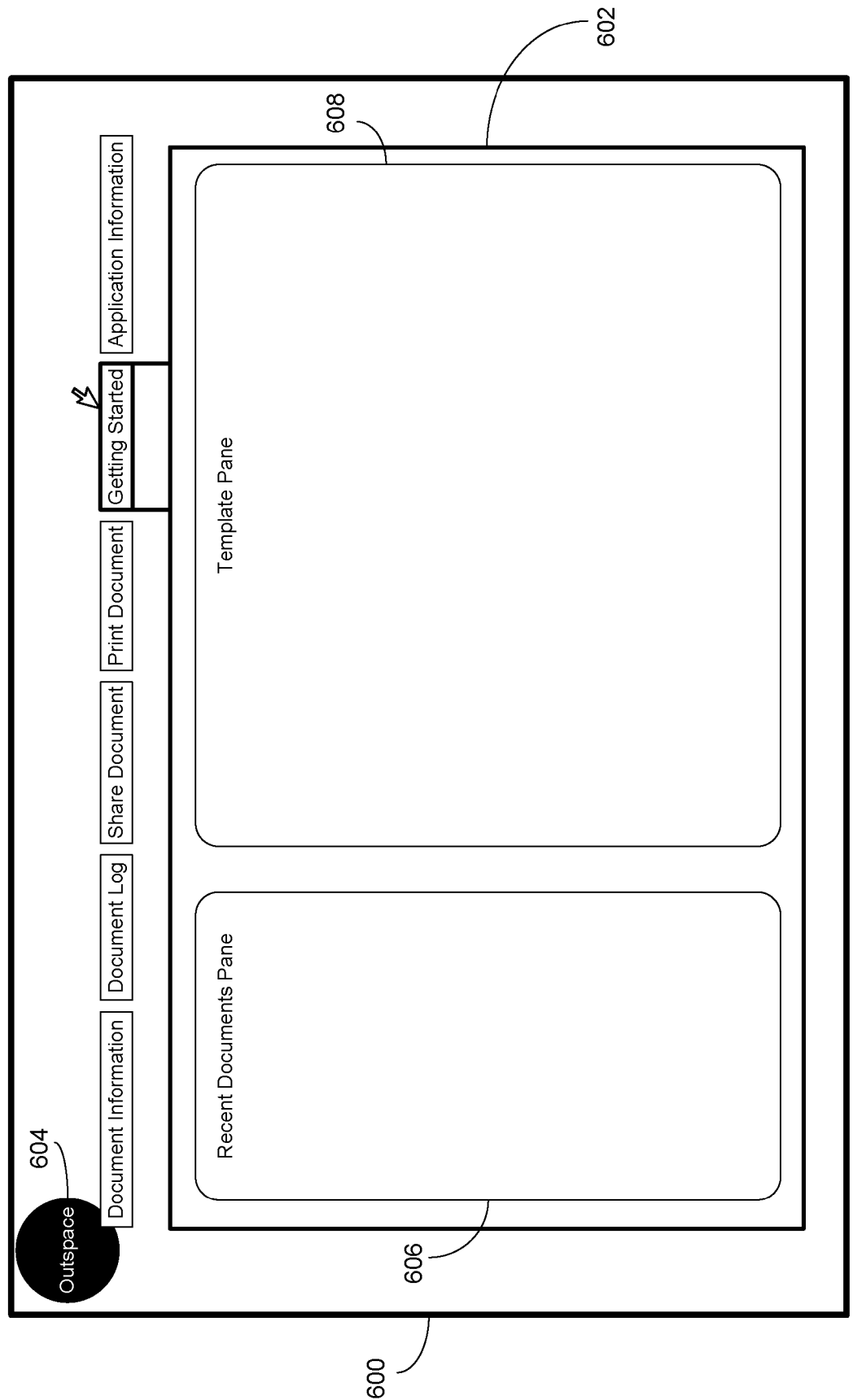
FIG. 6 represents one example of an out-space user interface having a getting started tab.

FIG. 6 represents one example of an out-space user interface having a getting started tab. Document editor 600 includes expanded ribbon 602 and out-space actuator 604. Expanded ribbon 602 may not include a document image in that the getting started tab indicates that a document has not been generated yet. As depicted in FIG. 6, document editor 600 may include getting started tab. Getting started tab may be associated with recent documents pane 606 and template pane 608. Recent document pane 606 may include a list of recently access documents. Templates pane 608 may include a plurality of selectable templates. In one aspect, the selectable templates are thumbnails and upon selection, the in-space user interface is automatically populated. Stated another way, the user is taken from the out-space user interface to the in-space user interface because the selection of a template indicates that the user desires authoring a document.

Figure 7:
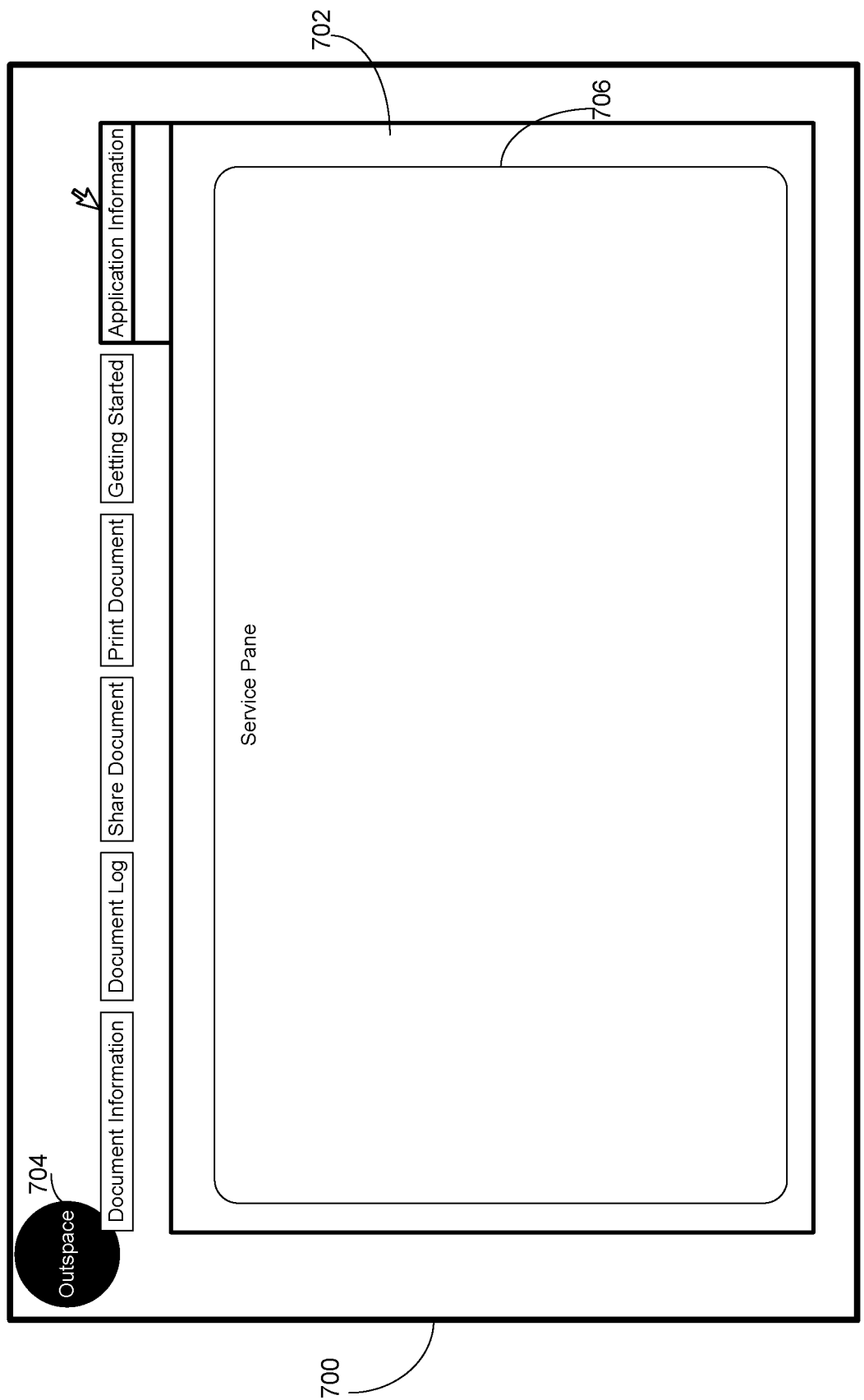
FIG. 7 represents one example of an out-space user interface having a application information tab.

FIG. 7 represents one example of an out-space user interface having an application information tab. Document editor 700 includes expanded ribbon 702 and out-space actuator 704. Expanded ribbon 702 may or may not include a document image depending on whether the document has been created. As depicted in FIG. 7, document editor 700 may include application information tab. Application information tab may be associated with service pane 706. Service pane 706 may include online services associated with the document editor. Service pane 706 may include password features, online events, product trials, help features, security updates, diagnostics, training, etc.

Figure 8:
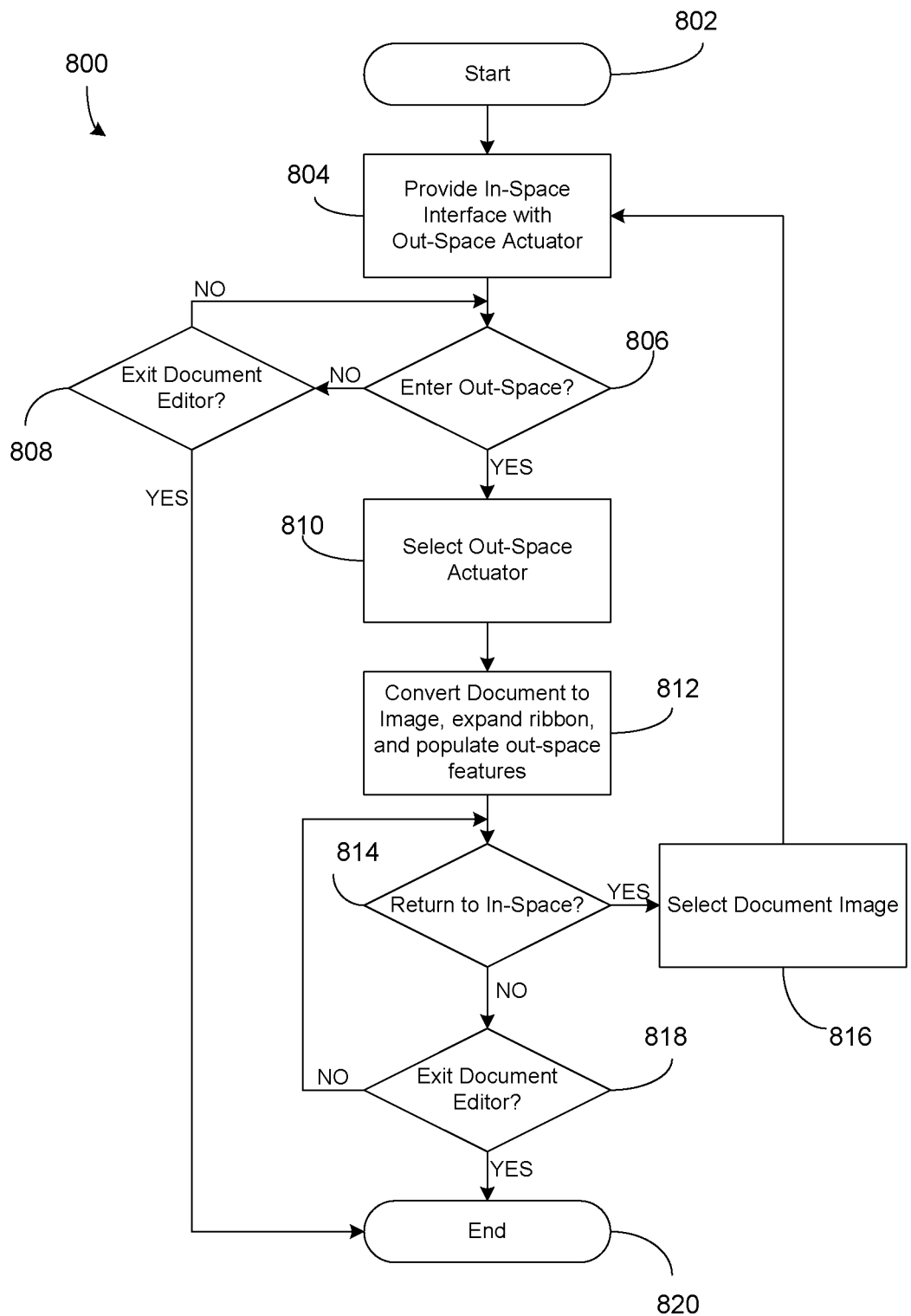
FIG. 8 represents one exemplary operational flow diagram for accessing an out-space user interface in a document editor program.

FIG. 8 represents one exemplary operational flow diagram for accessing an out-space user interface in a document editor program. Operational flow 800 begins at start operation 802 and continues to operation 804 where an in-space interface is provided that includes an out-space actuator. An example of an in-space interface may include FIG. 1. Operational flow 800 continues to decision operation 806 where it is decided whether to enter out-space. If not, operational flow 800 continues to decision operation 808 where it is determined whether to exit the document editor. If it is decided to exit the document editor, operational flow continues to end operation 820. If it is decided to not exit the document editor, operational flow 800 loops back.

If it is decided to enter out-space, operational flow 800 continues to operation 810 where the out-space actuator is selected. When the out-space actuator is selected, the document is converted to an image, the ribbon is expanded and out-space features are populated in the user interface as indicated by operation 812. In another aspect, a document image is not created.

Operational flow continues to decision operation 814 where it is decided whether to return to in-space. If not, operational flow 800 continues to decision operation 818 where it is determined whether to exit the document editor. If it is decided to exit the document editor, operational flow continues to end operation 820. If it is decided to not exit the document editor, operational flow 800 loops back. If it is decided to enter in-space, operational flow 800 continues to operation 816 where the document image is selected. In another aspect, an in-space actuator is selected. Operational flow 800 then loops back to operation 804.

Figure 9:
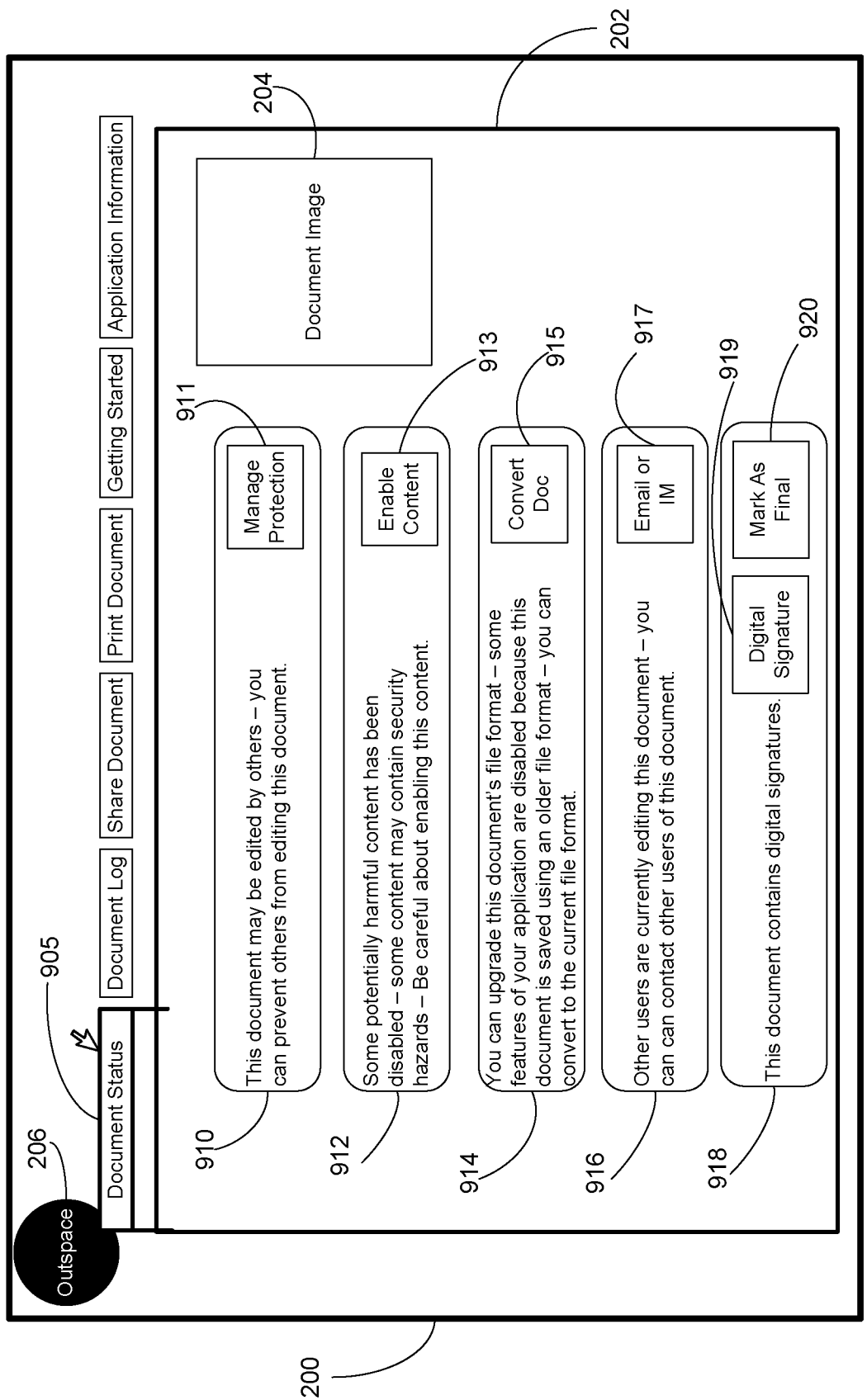
FIG. 9 represents one example of an out-space user interface showing a number of document status information panes and associated application feature selection controls.

FIG. 9 represents one example of an out-space user interface showing a number of document status information panes and associated application feature selection controls. As illustrated in FIG. 9, a document status tab 905 is provided for displaying status information about the document being edited in the application in-space. As should be appreciated, the document status tab 905 is for illustration purposes only and is not limiting of the different types and locations of selectable controls for causing a display of document status information in the expanded ribbon 202, described herein. As should be appreciated, the document editor 200 may be configured for automatically displaying the document status information, illustrated in FIG. 9, upon actuation of the out-space actuator 206.

Referring still to FIG. 9, a number of document status panes or slabs 910, 912, 914, 916, 918 are displayed. The document panes 910-918 are illustrative of user interface components in which various types of document status may be displayed in association with a document being edited in the document editor in-space.

According to one embodiment, features and/or functionalities associated with displayed document status may be exposed in proximity to the displayed document status for selectively accessing the associated features and/or functionalities for affecting changes to a given document status. As illustrated in FIG. 9, selectable controls 911, 913, 915, 917, 919, 920 are illustrated as being displayed inside associated document status panes for selectively accessing features for affecting changes to document status displayed in the associated document panes 910-918. Accordingly, if a given type of document status is displayed in a document pane, for example, pane 910, and if an application feature or functionality is available for affecting a change to the displayed document status, a selectable control 911 may be displayed in the document pane for accessing the associated feature or functionality for affecting a change to the displayed document status. Alternatively, instead of providing a selectable control for accessing a given feature or functionality, information may be provided in the status pane as to the identity and nature of available features that may be utilized for affecting changes to the associated document status.

Referring still to FIG. 9, status information and associated application features exposed via the document status panes 910-918 may include a variety of types of document status. For example, referring to the document status pane 910, information on a present security or protection status of the document may be provided. For example, as illustrated in FIG. 9, if the present document has a security status that allows others to open and edit the document, a status string such as "this document may be edited by others" may be provided in the document status pane 910 for alerting a user that the present security status for the document allows others to edit the document rather than the document being in a "read-only" mode.

According to embodiments, in addition to providing the present status of the document, for example, the present security status of the document, information may be provided in the associated document status pane to alert the user that the user may make changes to the displayed status. For example, as illustrated in the document status pane 910, an additional string of "you can prevent others from editing this document" is provided to alert the user that the user may affect changes to the present security status of the document. Thus, the status information provided in the status panes 910-918 is made richer by explaining to a user what the impact of a change in the status could be which will further promote the user's desire to use the available feature for changing the present document status.

If an application feature is available for affecting changes to the document status, the application feature may be exposed in the document status pane 910 in the form of a selectable control 911 for selectively accessing the available feature. For example, a "manage protection" control 911 is illustrated in the document pane 910. After the user reads the present document's security status and learns that the present document's security status may be changed, the user may select the "Manage Protection" control 911 for accessing the security features of the associated document editor application for making changes to the present security status. For example, the user may be allowed to encrypt the document, the user may be allowed to restrict formatting to the document, the user may be allowed to place the document in "read-only" mode, the user may be allowed to access an information rights management (IRM) application for setting various access and editing permissions on document, and the like. Advantageously, the user is provided useful status information about the document, and where a feature or functionality is available for changing the present status of the document, access to the feature or functionality is exposed in proximity to the provided status information, as illustrated in FIG. 9.

Referring still to FIG. 9, other types of document status and associated features are illustrated. For example, the document status pane 912 is illustrated for notifying a user that harmful content may be in the associated document and that the content has been disabled. As illustrated in FIG. 9, an "Enable Content" control 913 is displayed in the status pane 912 for allowing the user to selectively enable the content that has been otherwise disabled due to its suspected harmful nature.

Another type of document status, illustrated in document status pane 914, is whether the present document has been saved in a file format that is somehow incompatible or otherwise problematic in association with the present document editor version in use. For example, the in-use document editor may be a later version than the version with which the opened document was saved, and therefore, some application features otherwise available may not be available for use with the presently opened document unless the presently opened document is converted to the later version. Accordingly, the status pane 914 may include a status string such as "you can upgrade this document's file format—some features of your application are disabled because this document is saved using an older file format—you can convert the current file format." This display status text string not only provides the user with the present version status of the opened document, but alerts the user of the availability of a feature or functionality, for example, a document conversion feature, for affecting a change to the present status of the document. According to this example, because a document conversion feature is available, a "Convert Doc" control 915 may be displayed in the status pane 914 to allow the user to selectively access the document conversion feature for converting the opened document to the later version so that all of the features available to the later version of the document editor application may be used with the opened document.

The status pane 916 illustrates status information as to whether others are currently editing the present document. The user is also notified that he/she may contact other users of the document to coordinate with other users or otherwise communicate with other users of the document. As should be appreciated, this type of status may be provided when the document is available via a collaborative document sharing program that allows one or more users, for example, users in a collaborative work team, to open a given document and make edits to the document. The status illustrated in status pane 916 may be used to notify a given user that another user is currently editing the document, and an "Email or IM" control 917 may be provided for allowing the present user to send and electronic mail or instant message to other users of the document. As should be appreciated, email or instant messaging are only examples of two types of communication and are not limiting of other types of communication systems that may be provided.

Referring still to FIG. 9, the document status pane 918 illustrates document status for notifying a user as to whether a document contains digital signatures, or whether a document's digital signature has been invalidated or otherwise compromised. For example, if a previous user has edited and finalized the present document, and has applied a digital signature to the document, the digital signature may be used to notify subsequent users that the user who has applied the digital signature has reviewed the document and has marked the document as final. The status information illustrated in status pane 918 may be used to notify a present user that such digital signature has been applied to the document. If the present user wishes to affect a change to the signature information applied to the present document, a "Digital Signature" control 919 may be provided for allowing changes to the digital signature status of the document. Other associated controls such as the "Mark as Final" control 920 may be provided for allowing the user to apply a status to the document to alert subsequent users that the document has been finalized by a previous user.

As should be appreciated, the types of document status and the associated selectable feature controls illustrated in FIG. 9 are for purposes of example only, and are not limiting of the vast amounts and types of document status that may be displayed in a document status pane 910-918, and are not limiting of the vast numbers of associated features and/or functionalities that may be exposed in the status panes 910-918 for affecting changes to document status. For example, status information and related features and/or functionalities may be exposed via other document information panes available in the out-space user interface. For example, referring back to FIG. 5, the print menu 508 could be used to expose temporary print settings being applied to the document. In addition, the location and configuration of the status panes 910-918 and the feature controls 911-920 are not limiting of the different orientations and layouts that may be utilized for providing the information and associated feature controls in the out-space 202 described herein.

According to an embodiment, information displayed in the document status panes 910-918 is dynamically maintained so that as associated status information changes for a document, the information displayed in the status panes 910-918 and the selectable feature controls 911-920 exposed for the associated status are changed as the document status changes. That is, as document status changes, a determination is made as to whether a different feature is available for use with the changed status, and if so, the different feature may be exposed with the dynamically updated status information. For example, referring to the status pane 910, if the presently edited document is in "read-only" mode, the status string may be changed to alert the user that the document is presently in "read-only" mode and that the user can change the protection status of the document to allow others to edit the document.

According to an embodiment, the document status provided in the document status panes 910-918 may be programmed to always be displayed when the document status tab 905 or other means for displaying document status is actuated, or individual types of document status or all document status may only be displayed when a given type of document status has changed or has met some threshold criteria for being displayed. For example, information associated with the disablement of harmful content, as illustrated in the status pane 912, may be programmed to only display in the out-space if harmful content has been recently disabled. On the other hand, such status may be set for display at all times in the out-space 202 for alerting users of the potential of harmful content in a given document. That is, the document status may have a permanent home in the out-space user interface whether the status has changed or not, or the document status may be displayed in an associated document status pane only when a change has occurred in the associated status. For another example, the digital signature information illustrated in the status pane 918 may be programmed such that the information is only displayed if a change has occurred in the associated document that invalidates or otherwise compromises a previously applied digital signature.

Figure 10:
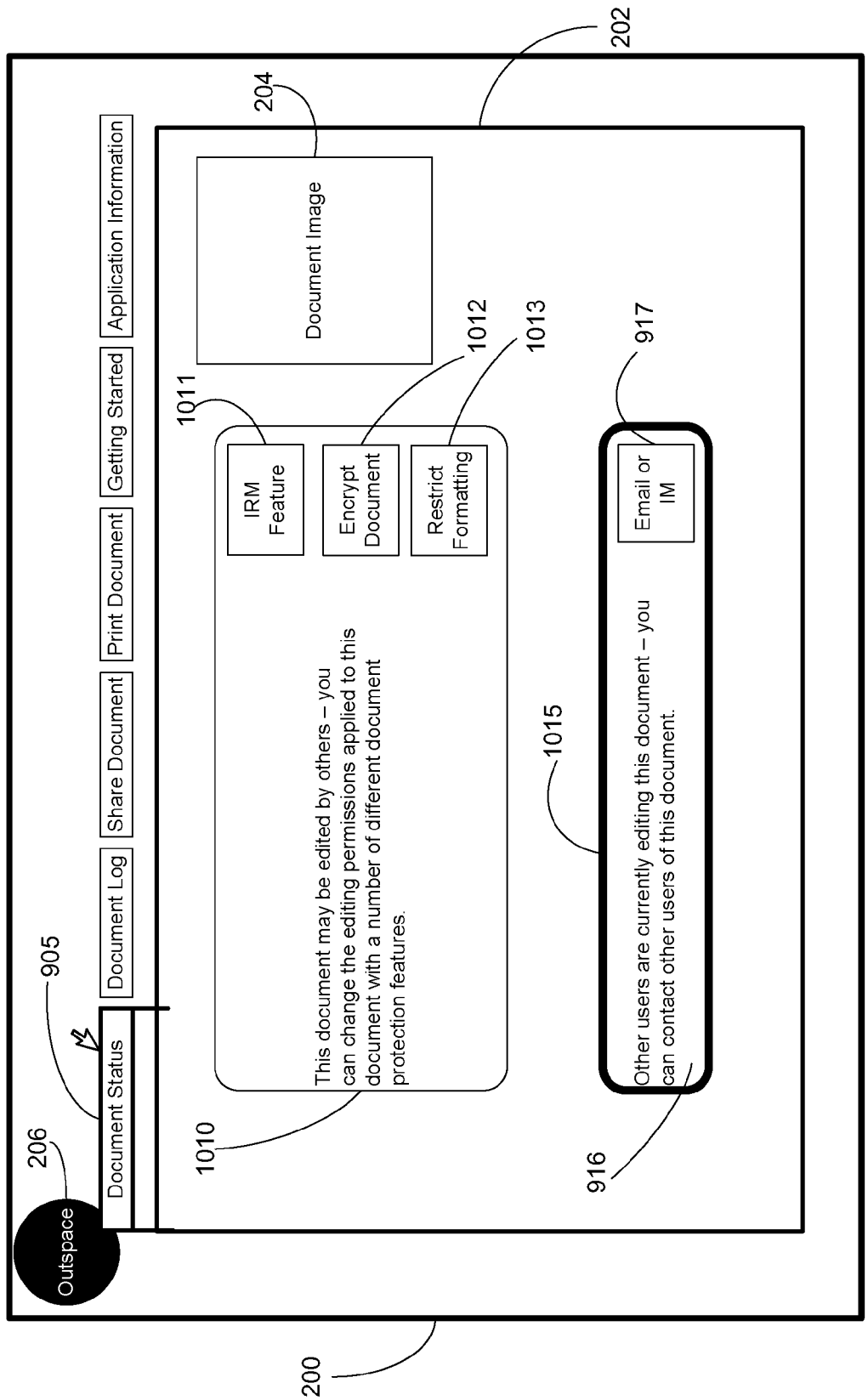
FIG. 10 represents one example of an out-space user interface showing a number of document status information panes and associated application feature selection controls.

FIG. 10 represents another example of an out-space user interface showing a number of document status information panes and associated application feature selection controls. A document status pane 1010 is illustrated in FIG. 10 showing a logical grouping of available features for affecting a change to the present document status. The document status illustrated in the status pane 1010 is associated with the present security status of the document. For example, the status provided in the pane 1010 alerts the user that the document may be edited by others, and that the user may change the editing permissions applied to the document with a number of different document protection features. Selectable controls 1011, 1012, 1013 are provided in the expanded pane 1010 for providing the user access to the various document protection features available to the user for affecting a change to the present security status or editing permissions status of the document. For example, an "IRM" feature control 1011 may allow the user to apply various document editing permissions to the associated document. "Encrypt Document" control 1012 may allow the user to access a feature for applying an encryption to the edited document, and a "Restrict Formatting" feature 1013 may allow the user to access a feature for restricting formatting that may be applied to the document, for example, where the document is a standardized document that should not receive formatting changes by various users having access to the document. Thus, one status pane may be used for exposing a variety of different features or for mapping a given type of status to a variety of different features.

Referring still to FIG. 10, the document status pane 916 is illustrated with a border 1015 disposed around the perimeter of the status pane 916. According to an embodiment, status information provided in a given status pane 910-918 may be designated with differing severity or importance levels. According to one embodiment, the border 1015 may be used to highlight or color-code the associated status pane 916 for alerting a user as to the severity or importance level applied to the displayed status. For example, status of low importance may be color-coded with a green border 1015, status information having a medium severity or importance level may be color-coded with a yellow border 1015, and status information having a high severity or importance level may be color-coded with a red border 1015. For example, if a document is found to contain harmful content, for example, an unknown macro or ActiveX control, a status pane, such as status pane 912, illustrated in FIG. 9, may be provided having a border 1015 or other appropriate identification mechanism for alerting the user that the status information is of sever or high importance to the user. As should be appreciated, the color-coding and the use of a border 1015 are for purposes of example only, and are not exhaustive of the many ways in which severity and/or importance levels may be indicated to a user. For example, a color-coded bar may be disposed along one end of the status pane or along and upper or lower edge of the status pane. Likewise, a variety of importance-level icons, for example, flags, stars, and the like, may be utilized for indicating severity and/or importance level.

Figure 11:
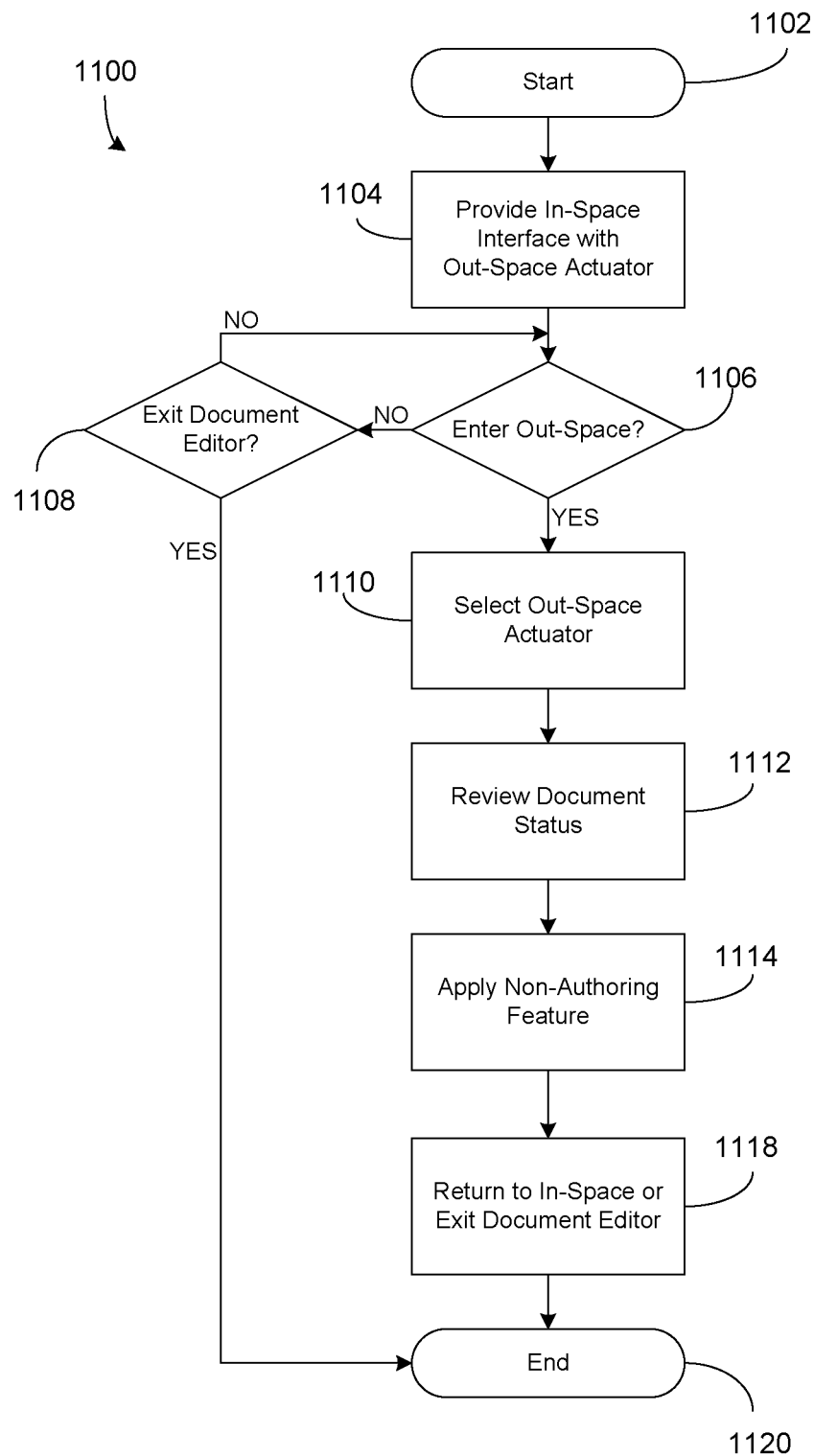
FIG. 11 represents one exemplary operation flow diagram for accessing document status and associated application features via an out-space user interface in a document editor program.

FIG. 11 represents an exemplary operational flow diagram for accessing document status and associated application features via an out-space user interface in a document editor program. Operational flow 1100 begins at start operation 1102 and continues to operation 1104 where an in-space user interface is provided that includes an out-space actuator, as described above. For purposes of example, consider that the operational flow 1100, illustrated in FIG. 11, is associated with a user's desire to obtain one or more types of document status for a document being edited with the document editor 200.

Operational flow 1100 continues to decision operation 1106 where it is determined whether to enter the out-space user interface. If not, operational flow 1100 continues to decision operation 1108 where it is determined whether to exit the document editor. If it is determined to exit the document editor, operational flow continues to end operation

1120. If it is determined to continue editing the document, operational flow 1100 loops back. If the user has decided to enter the out-space user interface for obtaining one or more types of document status, operational flow 1100 continues to operation 1110 where the out-space actuator is selected. When the out-space actuator is selected, the document may be converted to an image, the ribbon may be expanded, and out-space features may be populated in the user interface, as illustrated and described above. According to another embodiment, and document image may not be created.

At operation 1112, after selection of the document status tab 905 or other appropriate actuation method for displaying document status, one or more types of document status may be displayed in associated document status panes 910-918, 1010, as illustrated and described above with reference to FIGS. 9 and 10. In addition, if any features and/or functionalities are available for affecting change to displayed document status, one or more selectable feature and/or functionality controls 911-920, 1011-1013 may be displayed in the associated status panes, or alternatively, information about the identity and nature of available features or functionalities may be displayed in the status panes. After review of the displayed status and any available associated features, operational flow continues to operation 1114, and a desired non-authoring feature, for example, a feature for changing editing permissions to the edited document, may be applied for changing the associated status of the document.

According to an embodiment, after a given feature or functionality is utilized, the status information displayed in the associated status pane may be changed to reflect new status. For example, if based on the change in status, the selected feature or functionality may no longer be applicable, and therefore, that feature or functionality may be removed from the status pane. Alternatively, the associated status pane may be removed from display after a change in status. Or, after a change in status, the user may be automatically returned to the in-space user interface.

After document status has been reviewed and changed, if desired, operation flow proceeds to operation 1118 for a return to the in-space user interface or for an exit from the document editor. Operational flow ends at operation 1120.

Figure 12:
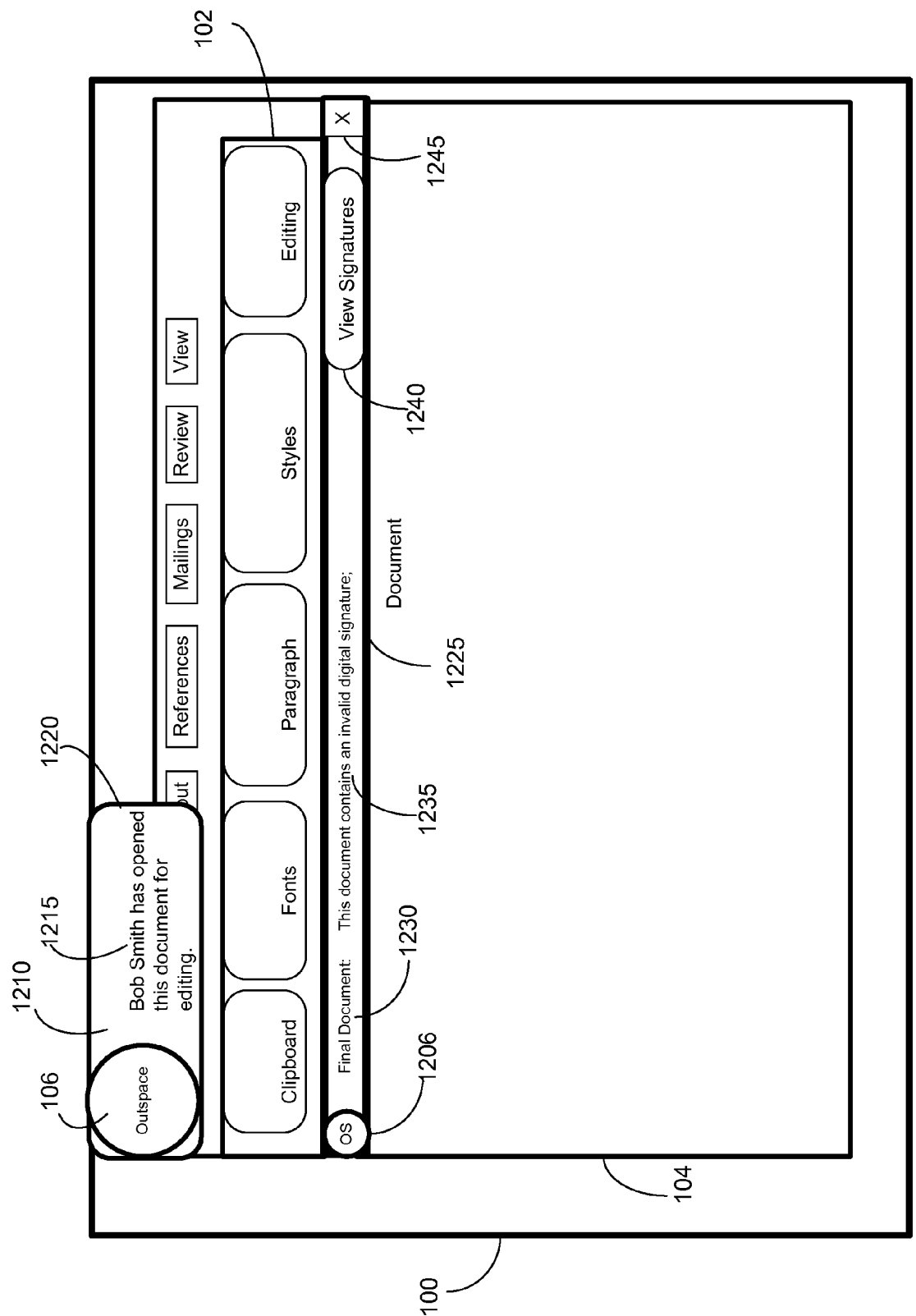
FIG. 12 represents one example of an in-space user interface having an out-space communication user interface component and having an improved message bar user interface component.

As described above with reference to FIGS. 1-11, a variety of document information, including document status information may be provided via the out-space user interface. As described below with reference to FIGS. 12-14, communication between the out-space user interface and the in-space user interface is provided for alerting a user that information potentially of interest to the user is available in the out-space user interface. FIG. 12 represents an example of an in-space user interface having an out-space communication user interface component and having an improved message bar user interface component.

According to embodiments of the invention, information displayed in one or more document information or status panes in the out-space user interface is dynamically updated as associated information about the document changes. As illustrated in FIG. 12, an out-space communication user interface (UI) component 1210 is provided for communicating document status information contained in the out-space user interface to alert a user that the information contained in the out-space communication UI component represents a change in the document status that may be of interest to the user. For example, the out-space communication UI component 1210, illustrated in FIG. 12, contains an example text string 1215 of "Bob Smith has opened this document for editing."

According to embodiments, the out-space communication UI component 1210 temporarily displays in the in-space user interface to quickly relay the status information to alert the user that he/she should launch the out-space user interface to lean more about the status change of the document being edited. To allow the user to quickly launch the out-space user interface, the out-space actuator 106 is displayed in close proximity to or inside the out-space communication UI component 1210. As should be appreciated, the information contained in the temporarily displayed out-space communication UI component may be any information about the document that may be displayed in the out-space user interface as described herein with reference to FIGS. 1-15.

The out-space communication UI component 1210, illustrated in FIG. 12, is generally rectilinear in shape and contains the out-space actuator 106 inside the UI component 1210. As should be appreciated, the shape and orientation of the UI component 1210, illustrated in FIG. 12, is for purposes of example only and is not limiting of the vast number of shapes and orientations that may be used for the UI component 1210 and is not limiting of the locations at which the UI component 1210 may be placed in the in-space user interface for alerting a user of associated information contained in the out-space user interface.

According to one embodiment, the out-space communication UI component 1210 may be visually highlighted, for example, color-coding, addition of icons, and the like, for indicating a severity or importance level associated with the information being communicated from the out-space user interface. For example, a border 1220 disposed around the example UI component 1210 may be color-coded to indicate a severity or importance level associated with the information being communicated from the out-space user interface.

According to one embodiment, the communication UI component 1210 may be displayed temporarily, for example, N seconds, after it becomes visible, and the amount of time for the display of the UI component may be increased or decreased if desired. Alternatively, the UI component may be manually dismissed by selecting (e.g., "clicking") anywhere on the UI component 1210. In addition, selecting the actuator 106 for displaying the out-space user interface may cause an automatic dismissal of the UI component 1210. If desired, presentation of the communication UI component 1210 may be accompanied by an audible sound for further calling attention to the information displayed in the communication UI component 1210.

Figure 13:
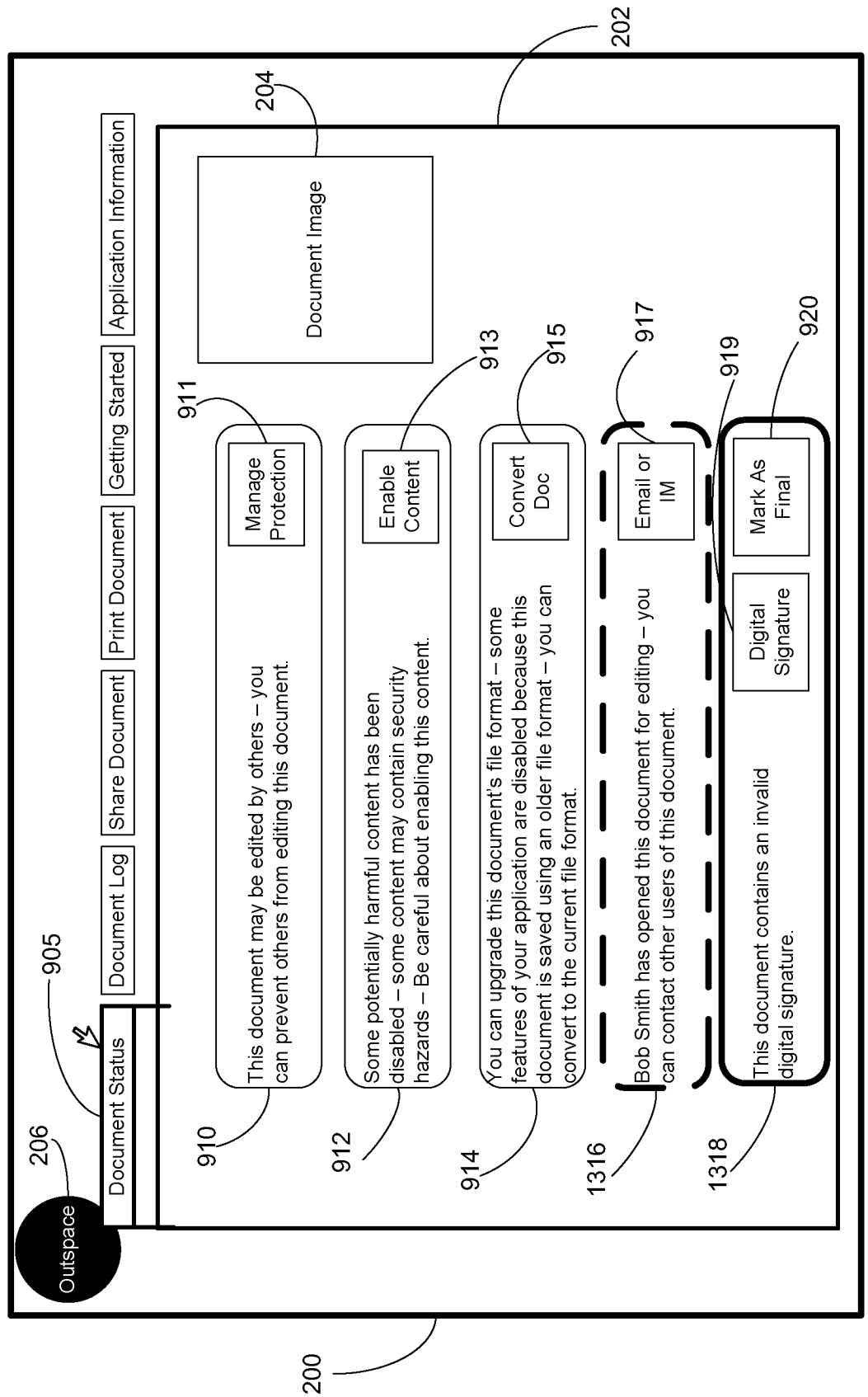
FIG. 13 represents one example of an out-space user interface showing a number of document status information panes and associated application feature selection controls.

Referring now to FIG. 13, if a user selects the out-space actuator 106 displayed in or in proximity to the out-space communication UI component 1210, the out-space user interface is automatically launched, as described above, with reference to FIGS. 1-11. According to one embodiment, a document information or document status pane 1316 that contains document information or status associated with the communication that was presented via the temporarily displayed out-space communication UI component may be highlighted in a manner that brings a user's attention to the information or status pane 1316 associated with the information that was communicated via the temporarily displayed out-space UI component.

For example, as illustrated in FIG. 13, the document status pane 1316 contains information that another user has opened the document being edited by the present user and provides the present user information on how the user may check out the document or change the status of the document in response to the information provided to the present user. To alert the user to the specific status pane associated with the communication provided to the user via the out-space communication UI component 1210, a visual indication, for example, a highlighted broken border, is displayed around the associated information or task pane. As should be understood, a variety of visual indications may be utilized for drawing attention to a particular information or status pane associated with the communication that was provided via the temporarily-displayed out-space communication UI component. For example, information or status panes associated with communications provided via the temporarily displayed out-space communication UI component may be color-coded with a particular color, for example, green, to quickly alert the user as to which information or status pane to review. As described above, color-coding may be used for information or status panes to indicate severity or importance levels associated with the information contained therein. To distinguish such visual indications from a visual indication used for associating a particular information or status pane with the communication presented via the out-space communication UI component 1210, a differing visual indication may be utilized.

Referring back to FIG. 12, a message bar 1225 is provided for communicating information from document information contained in the out-space user interface and for alerting a user of a potential need for launching the out-space user interface to review additional information and to select one or more features or functionalities for affecting non-authoring changes to the document being edited. As illustrated in FIG. 12, the message bar 1225 is displayed underneath the ribbon 102 and remains displayed until the message bar 1225 is dismissed by user action, for example, by selecting the close button 1245. Information displayed in the message bar 1225 may include an information subject 1230 and an information summary 1235 for providing a subject and information summary of information communicated to the message bar 1225 from the out-space user interface. According to one embodiment, selecting (e.g., clicking on) the message text 1235 will launch the out-space user interface to allow a user to review the associated status information and to utilize any available features or functionalities, if desired. In addition, selectable controls 1240 may be provided in the message bar 1225 for selectively obtaining one or more features and/or functionalities for receiving additional information or for changing status or properties associated with the document being edited.

An icon 1206 may be provided in the message bar 1225 for drawing a user's attention to the specific type of status information contained in the out-space user interface that corresponds to the presently displayed message bar 1225. For example, if the status in the message bar is associated with document security information in the out-space user interface, the icon 1206 may be in a form that draws the user's attention to a status pane containing security information.

For example, as illustrated in FIG. 12, an example information string indicating that the present document contains and invalid digital signature is provided in the message bar 1225, and a selectable control allowing the user to view signatures associated with the document is provided. Thus, if the user selects the provided control 1240, the user may be provided with the features or functionalities associated with a digital signature application to allow the user to view the digital signatures that have been applied to the document. As should be appreciated, the example information and selectable controls, illustrated in FIG. 12, are for purposes of illustration only and are not limiting of the vast amount of information and features that may be made available via the message bar 1225.

The shape and size of a message bar 1225 may be scaled to fit different display screens. That is, the message bar 1225 may be reduced in size or may be expanded in size depending on the available display screen space. In addition, more than one message bar 1225 may be displayed as additional information is communicated that may be of interest to the user. That is, an additional message bar 1225 may be displayed underneath the first message bar 1225 to communicate different types of document information or status in a second displayed message bar 1225.

Referring still to FIG. 12, if the user selects the out-space actuator 1206 displayed in or in proximity to the message bar 1225, the out-space user interface is launched to allow the user to review additional information and to obtain different features or functionalities associated with the information that was communicated via the displayed message bar 1225. For example, as illustrated in FIG. 13, a document status pane 1318 is shown to contain information corresponding to the information that was communicated to the in-space user interface via the displayed message bar 1225. As described above, a highlighting, for example, color-coding, or other acceptable visual indication may be used for the corresponding information or status pane 1318 for allowing the user to quickly determine the information or status pane containing information corresponding to the communication provided via the displayed message bar 1225.

As should be appreciated, a distinctive visual highlighting may be utilized for information or status panes 1318 associated with communications to the temporarily displayed out-space communication UI component, and a different visual indication may be utilized for information or status panes associated with communications provided via the displayed message bar 1225. Thus, when a user launches the out-space user interface, the user may readily distinguish an information or status pane associated with the temporarily displayed communication UI component as opposed to information communicated via the displayed message bar 1225. As illustrated in FIG. 13, the information associated with the temporarily displayed UI component is shown with a broken outlining border, and the status pane associated with the displayed message bar is visually highlighted with a solid border. Other visual indications may be utilized to give the information or status pane associated with the temporarily displayed communication UI component a loud visual indication and for giving the information or status pane associated with the displayed message bar a louder or loudest visual indication.

Figure 14:
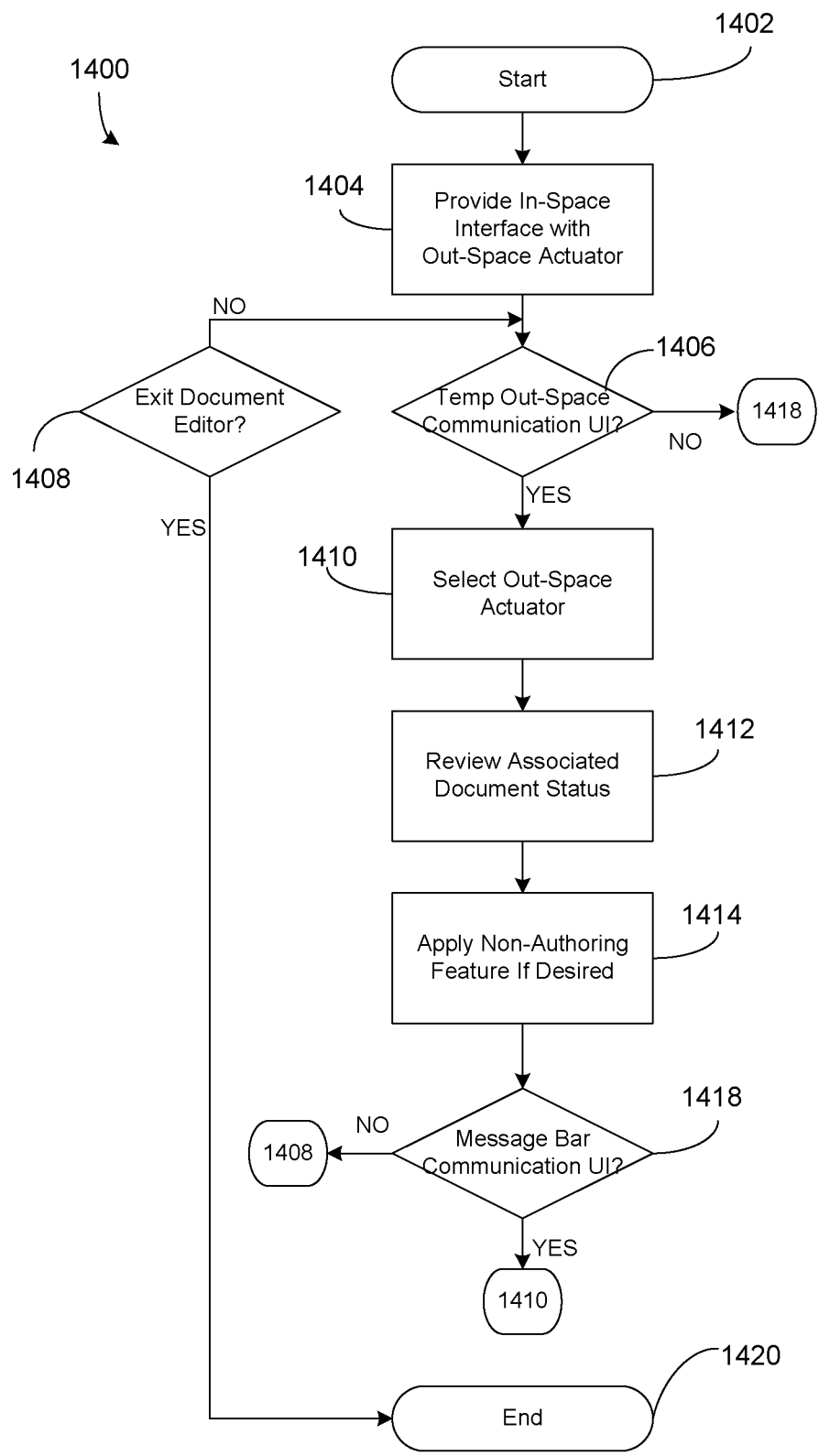
FIG. 14 represents one exemplary operational flow diagram for receiving a communication of document status via an out-space communication user interface component, and via an improved message bar user interface component.

FIG. 14 represents an exemplary operational flow diagram for receiving a communication of document status via an out-space communication user interface component and via an improved message bar user interface component. For purposes of description of the operational flow diagram illustrated in FIG. 14, consider that a user of a given document receives information via the temporarily displayed out-space communication UI component and/or via the displayed message bar user interface component. Operation flow 1400 begins at operation 1402 and continues to operation 1404 where an in-space user interface is provided that includes an out-space actuator. An example of an in-space user interface may include FIG. 1. Operational flow 1400 continues to decision operation 1406 and a determination is made as to whether a temporary out-space communication UI component has been displayed. If not, operational flow continues to operation 1418, as described below.

If a temporary out-space communication UI component 1225 is displayed, operational flow continues to operation 1410. At operation 1410, a user may review information contained in the temporarily displayed out-space communication UI component 1225, and if desired, the user may select the out-space actuator for launching the out-space user interface. At operation 1412, the user may review associated document status or information, and at operation 1414, the user may apply non-authoring features and/or functionalities if desired. As described above, in order to alert the user as to the particular information or status pane contained in the out-space user interface associated with the communication provided the temporarily displayed out-space communication component, the associated information or status pane contained in the out-space user interface may be visually highlighted in some manner to indicate its relationship to the information provided to the user via the temporarily displayed out-space UI component.

At operation 1418, if the message bar 1225 is dynamically populated with information communicated from an associated information or status pane contained in the out-space user interface that is of interest to the user, operational flow may proceed back to operation 1410, and the user may launch the out-space user interface. At operation 1412, the user may review the associated document information or status pane, and at operation 1414, the user may apply one or more features or functionalities available for changing document information or document status provided in the out-space user interface. As described above, the associated information or task pane displayed in the out-space user interface associated with the information communicated to the user via the message bar 1225 may be visually highlighted in some manner to quickly alert the user as to the particular information or status pane associated with the information being provided to the user via the message bar 1225. After the user has reviewed any information or status contained in the out-space user interface of interest to the user, the user may return to the in-space user interface to continue editing the document, or the user may exit the document editor, and operational flow may end at operation 1420. Thus, use of the temporarily displayed out-space communication UI component or the displayed message bar UI component allows for information to be communicated from the out-space user interface to the in-space user interface to alert a user of a given document that information contained in the out-space user interface may be of interest to the user.

By providing navigation between in-space and out-space, users may easily become familiar with out-space features because they are separated from authoring features. By separating in-space and out-space features, users may easily find features because the features are categorized. Features may be richer and provide more information and functionality because the "real estate" of the display is better utilized. A greater amount of "real estate" is available for out-space features, thereby allowing software developers the opportunity to increase the functionality of a document editor program. Channels of communication associated with a document are better managed because they are not mixed with in-space features.

Figure 15:
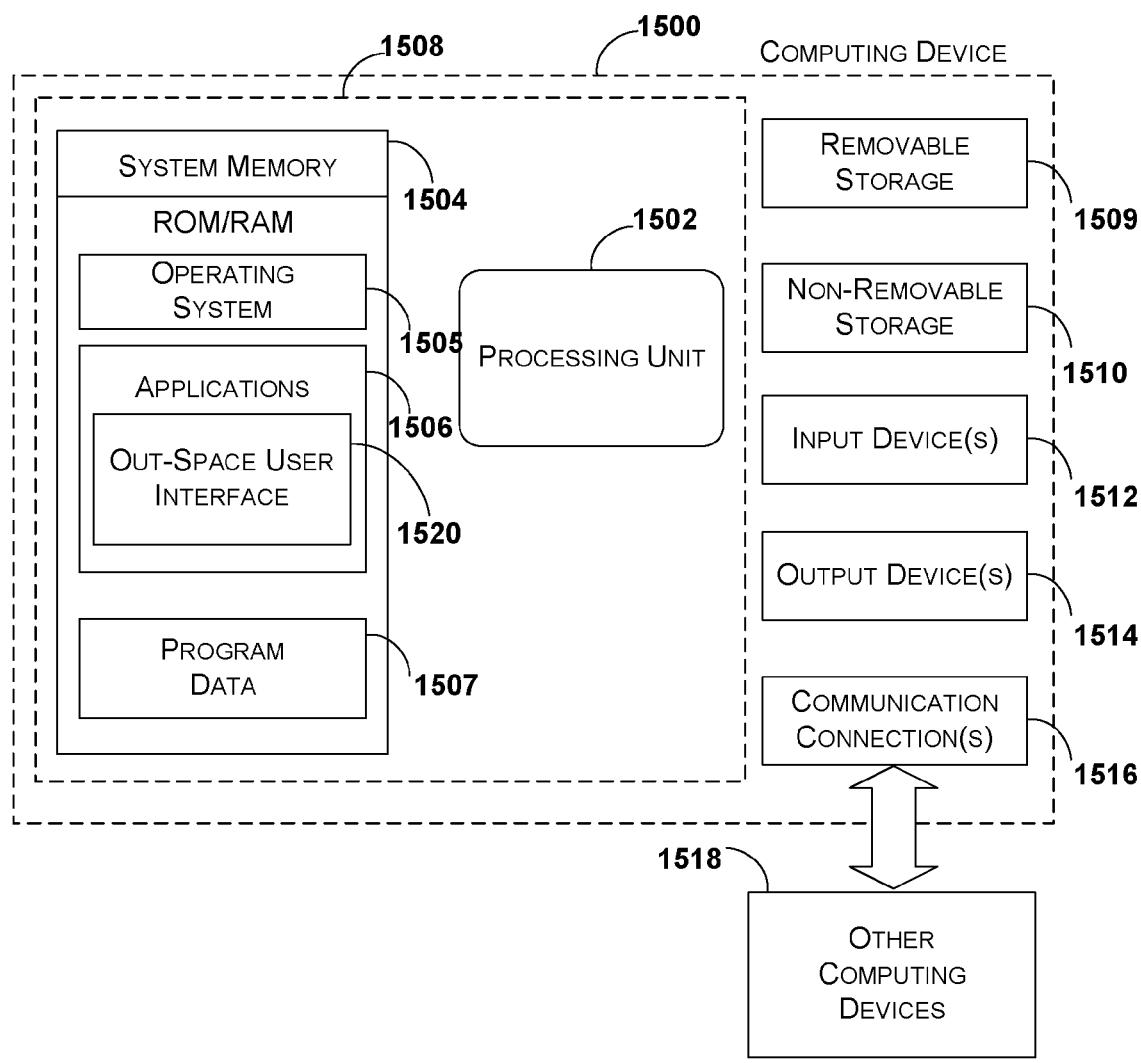
FIG. 15 represents an exemplary computing device with which embodiments of the present invention may be practiced.

Referring to FIG. 15, an exemplary system for implementing the invention includes a computing device, such as computing device 1500. In a basic configuration, computing device 1500 may include any type of stationary computing device or a mobile computing device. Computing device 1500 typically includes at least one processing unit 1502 and system memory 1504. Depending on the exact configuration and type of computing device, system memory 1504 may be volatile (such as RAM), non-volatile (such as ROM, flash memory, and the like) or some combination of the two. System memory 1504 typically includes operating system 1505, one or more applications 1506, and may include program data 1507. In one embodiment, applications 1506 further include application 1520 for accessing an out-space user interface. This basic configuration is illustrated in FIG. 15 by those components within dashed line 1508.

Computing device 1500 may also have additional features or functionality. For example, computing device 1500 may also include additional data storage devices (removable and/or non-removable) such as, for example, magnetic disks, optical disks, or tape. Such additional storage is illustrated in FIG. 15 by removable storage 1509 and non-removable storage 1510. Computer storage media may include volatile and non-volatile, removable and non-removable media implemented in any method or technology for storage of information, such as computer readable instructions, data structures, program modules or other data. System memory 1504, removable storage 1509 and non-removable storage 1510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1500. Any such computer storage media may be part of device 1500. Computing device 1500 may also have input device(s) 1512 such as a keyboard, mouse, pen, voice input device, touch input device, etc. Output device(s) 1514 such as a display, speakers, printer, etc. may also be included.

Computing device 1500 also contains communication connection(s) 1516 that allow the device to communicate with other computing devices 1518, such as over a network or a wireless network. Communication connection(s) 1516 is an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A method of exposing document features in association with status information for a document, comprising:
   displaying an in-space user interface and an out-space actuator within the in-space user interface associated with the in-space user interface, wherein the in-space user interface includes a display of authoring features and a document display area for creating and editing a document including displaying an editable document;
   receiving a status of the document;
   in response to receiving the status of the document, temporarily displaying the status next to the display of the out-space actuator within the in-space user interface and automatically removing the display of the status without user interaction;

determining a non-authoring feature that may be utilized for changing the status of the document;

receiving a selection of the out-space actuator;

in response to receiving the selection of the out-space actuator, removing the display of the editable document from within the document display area and displaying an out-space user interface including a display of the non-authoring feature and other non-authoring features within the document display area;

displaying the status of the document in the out-space user interface; and displaying information about the non-authoring feature that may be utilized for changing the status of the document in the out-space user interface with the displayed status of the document.

2. The method of claim 1, wherein displaying the status of the document in the out-space user interface includes displaying an explanation of how the status of the document may be changed by utilizing the determined features that may be utilized for changing the status of the document.

3. The method of claim 1, wherein displaying the status of the document in the out-space user interface includes displaying the status of the document in a document status display pane that is displayed in the out-space user interface.

4. The method of claim 3, further comprising displaying a selectable control in proximity to the displayed status of the document for accessing the feature for changing the status of the document.

5. The method of claim 4, wherein displaying a selectable control in proximity to the displayed status of the document includes displaying the selectable control in the document status display pane.

6. The method of claim 5, wherein displaying the status of the document in a document display pane includes applying a visual indication to the document status display pane to indicate an importance level associated with the displayed status of the document.

7. The method of claim 3, further comprising dynamically updating the status of the document displayed in the document status display pane as the status of the document changes.

8. The method of claim 3, further comprising determining a plurality of features that may be utilized for changing the status of the document.

9. The method of claim 8, further comprising displaying a selectable control for each of the plurality of features that may be utilized for changing the status of the document in the document status display pane as a logical grouping of feature controls for accessing each of the plurality of features for changing the status of the document.

10. The method of claim 1, wherein receiving a status of the document includes receiving information as to any restrictions on access to the document applied to the document.

11. The method of claim 1, wherein receiving a status of the document includes receiving information as to whether any digital signatures have been applied to the document.

12. The method of claim 11, wherein receiving a status of the document further comprises receiving information as to a status of any digital signatures applied to the document.

13. The method of claim 1, wherein receiving a status of the document includes receiving information as to whether the document is being edited by more than one user.

14. The method of claim 1, wherein receiving a status of the document includes receiving information as to whether any previous versions of the document are available for use.

15. The method of claim 1, wherein receiving a status of the document includes receiving information as to an edit mode applied to the document.

16. The method of claim 1, wherein receiving a status of the document includes receiving information as to a file format with which the document was generated.

17. A computer readable storage medium containing computer-executable instructions which when executed by a computer perform a method of exposing document features in association with status information for a document, comprising:

receiving a status of a document being edited and that is displayed in a computer-generated user interface;

in response to receiving the status of the document, temporarily displaying the status in the computer-generated user interface;

determining a non-authoring feature that may be utilized for changing the status of the document;

in response to selection of a control to show non-authoring features, removing a display of the document being edited and displaying a secondary computer-generated user interface for displaying the status of the document;

displaying the status of the document in the secondary computer-generated user interface; and displaying information about the non-authoring feature that may be utilized for changing the status of the document in the secondary computer-generated user interface with the displayed status of the document.

18. The computer readable storage medium of claim 17, wherein displaying the status of the document in the secondary computer-generated user interface includes displaying the status of the document in a document status display pane that is displayed in the secondary computer-generated user interface.

19. A method of exposing document features in association with status information for a document, comprising:

receiving a status of a document being edited in a computer-generated user interface;

in response to receiving the status of the document, temporarily displaying the status;

determining a non-authoring feature that may be utilized for changing the status of the document;

launching a secondary computer-generated user interface for displaying the status of the document;

displaying the status of the document in a document status display pane that is displayed in the secondary computer-generated user interface;

displaying a selectable control in the document status display pane for accessing the feature for changing the status of the document that when selected displays non-authoring features and when selected removes a display of the document being edited; and monitoring the status of the document, and dynamically updating the status of the document displayed in the document status display pane as the status of the document changes.

20. The method of claim 19, wherein in response to dynamically updating the status of the document displayed in the document status display pane as the status of the document changes, determining whether a different feature is available that may be utilized for changing the dynamically updated status of the document, and if a different feature is available that may be utilized for changing the dynamically updated status of the document, displaying a selectable control in the document status display pane for accessing the different feature that may be utilized for changing the dynamically updated status of the document.

* * * * *